(12) United States Patent
Partee et al.

(10) Patent No.: US 10,393,415 B1
(45) Date of Patent: Aug. 27, 2019

(54) SOLAR ENERGY-STORAGE COOLER AND ASSOCIATED METHODS

(71) Applicant: PTGHS, LLC, Fraser, CO (US)

(72) Inventors: Charles Partee, Golden, CO (US);
Kevin Magenis, Loveland, CO (US);
Brian Magenis, Loveland, CO (US);
Mike Nakamura, Portland, OR (US);
Andy Davis, Longmont, CO (US)

(73) Assignee: PTGHS, LLC, Fraser, CO (US)

( * ) Notice: Subject to any disclaimer, the term of this patent is extended or adjusted under 35 U.S.C. 154(b) by 0 days.

(21) Appl. No.: 15/809,996

(22) Filed: Nov. 10, 2017

Related U.S. Application Data

(63) Continuation-in-part of application No. 15/668,866, filed on Aug. 4, 2017.

(51) Int. Cl.
| | | |
|---|---|---|
| *G08B 13/00* | (2006.01) | |
| *F25B 27/00* | (2006.01) | |
| *H02J 7/35* | (2006.01) | |
| *H02J 7/00* | (2006.01) | |

(52) U.S. Cl.
CPC .......... *F25B 27/002* (2013.01); *H02J 7/0044* (2013.01); *H02J 7/355* (2013.01)

(58) Field of Classification Search
CPC ..... F25B 27/002; H02J 7/0044; H02J 7/0052; G08B 13/00
See application file for complete search history.

(56) References Cited

U.S. PATENT DOCUMENTS

| | | | |
|---|---|---|---|
| 4,939,912 A | 7/1990 | Leonovich, Jr. | |
| 5,153,561 A * | 10/1992 | Johnson | A45C 13/24 190/101 |
| 5,979,175 A | 11/1999 | Ellison | |
| 6,305,185 B1 * | 10/2001 | Sloan | A45C 5/14 62/235.1 |
| 7,481,070 B2 * | 1/2009 | Costanzo | F25B 27/005 62/235.1 |
| 7,722,204 B1 | 5/2010 | Sandberg | |

(Continued)

OTHER PUBLICATIONS

Tech Guru, Goal Zero Yeti 400 Lithium Review, Mar. 10, 2017, Nerd Techy—Your Guide to New Technology, https://nerdtechy.com/goal-zero-yeti-400-lithium-review.

(Continued)

*Primary Examiner* — Phung Nguyen
(74) *Attorney, Agent, or Firm* — Pritzkau Patent Group, LLC

(57) ABSTRACT

A solar energy-storage cooler includes an insulated housing and a lid movable between a closed position, sealing the opening, and an open position for access to an interior of the housing. A solar power source generates electrical energy for an energy storage component in the housing which is part of an energy storage device. The housing can include a separate secure compartment. A compartment door can close the secure compartment door for locking by a lock mechanism to limit unauthorized access to the secure compartment. The lid and compartment door can share a common hinge. A motion sensor can characterize motion of the housing. An estimate of time can be determined as predictive of a state of charge of the energy storage device. Temperature indications are provided responsive to a temperature sensor.

11 Claims, 17 Drawing Sheets

(56) References Cited

U.S. PATENT DOCUMENTS

| | | | |
|---|---|---|---|
| 8,353,167 B2 * | 1/2013 | McGann | F25B 21/02 |
| | | | 62/3.62 |
| 8,511,846 B1 | 8/2013 | Sandberg | |
| 9,024,570 B2 | 5/2015 | Workman et al. | |
| 9,124,099 B2 | 9/2015 | Kuriyama | |
| 9,871,396 B2 | 1/2018 | Hansen et al. | |
| 2009/0025411 A1 | 1/2009 | Anderson | |
| 2015/0084778 A1 | 3/2015 | Mittal et al. | |
| 2015/0114024 A1 * | 4/2015 | Grepper | F25D 23/00 |
| | | | 62/320 |
| 2016/0229437 A1 * | 8/2016 | Jackman | B62B 5/0073 |
| 2017/0104335 A1 * | 4/2017 | Williams | H02J 3/383 |
| 2017/0236043 A1 * | 8/2017 | Warmath | G08B 13/14 |
| | | | 235/385 |
| 2018/0034267 A1 | 2/2018 | Vasefi et al. | |

OTHER PUBLICATIONS

Jonathan Fincher, Solar Cooler Keeps Drinks Cold Using the Sun Instead of Ice, Jan. 23, 2014, New Atlas—New Technology & Science News, https://newatlas.com/solar-cooler/30567/.

* cited by examiner

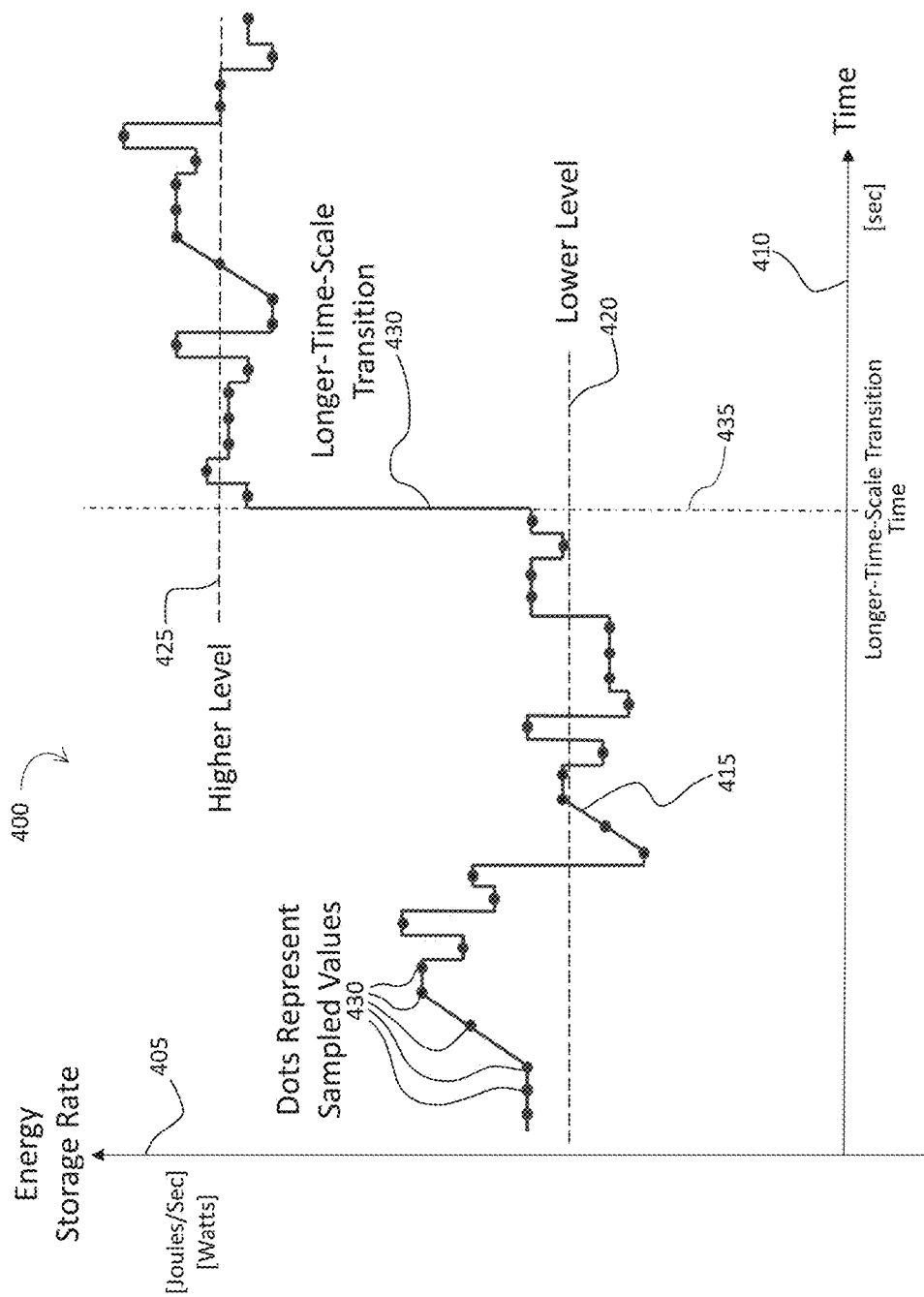

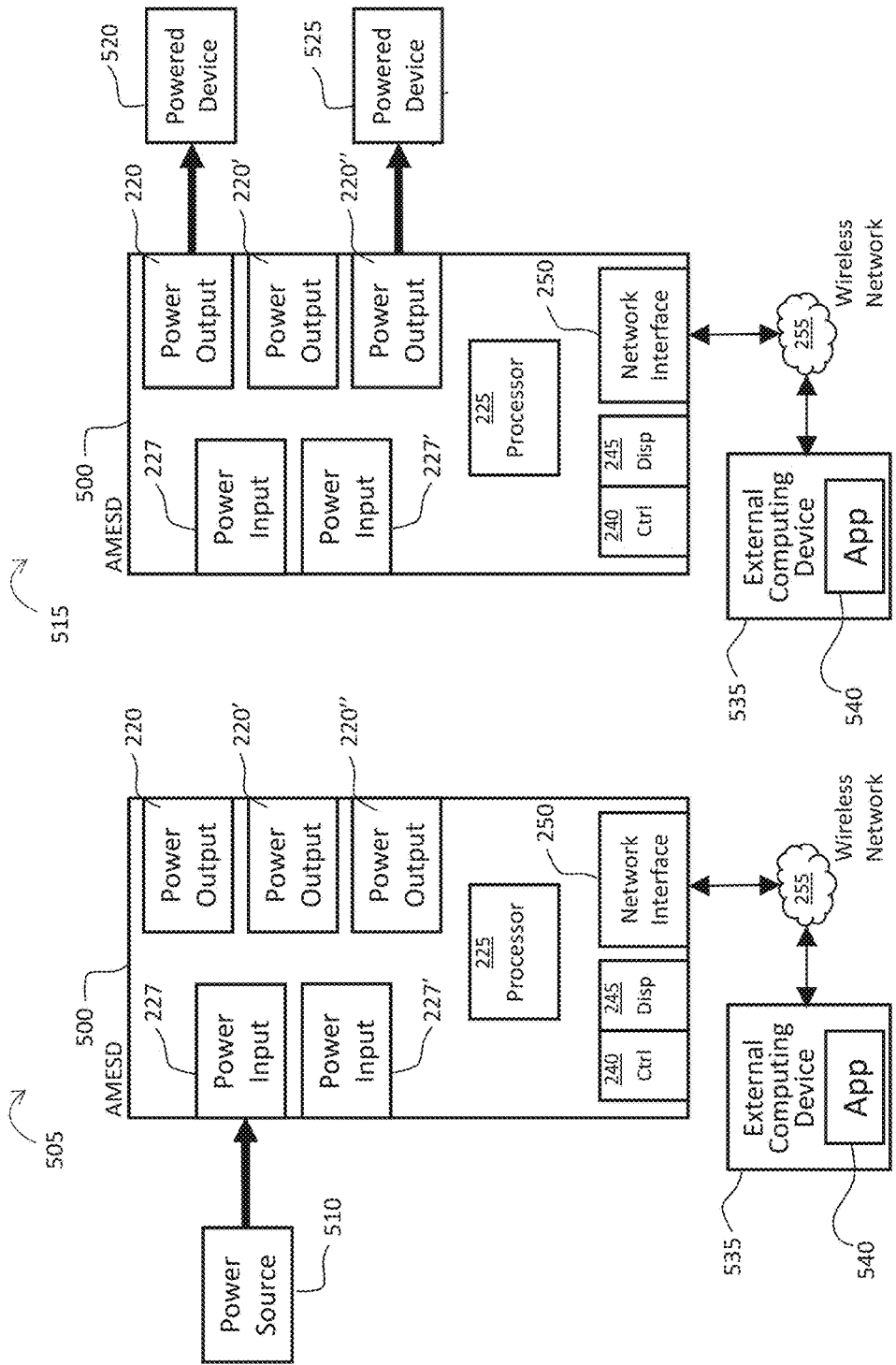

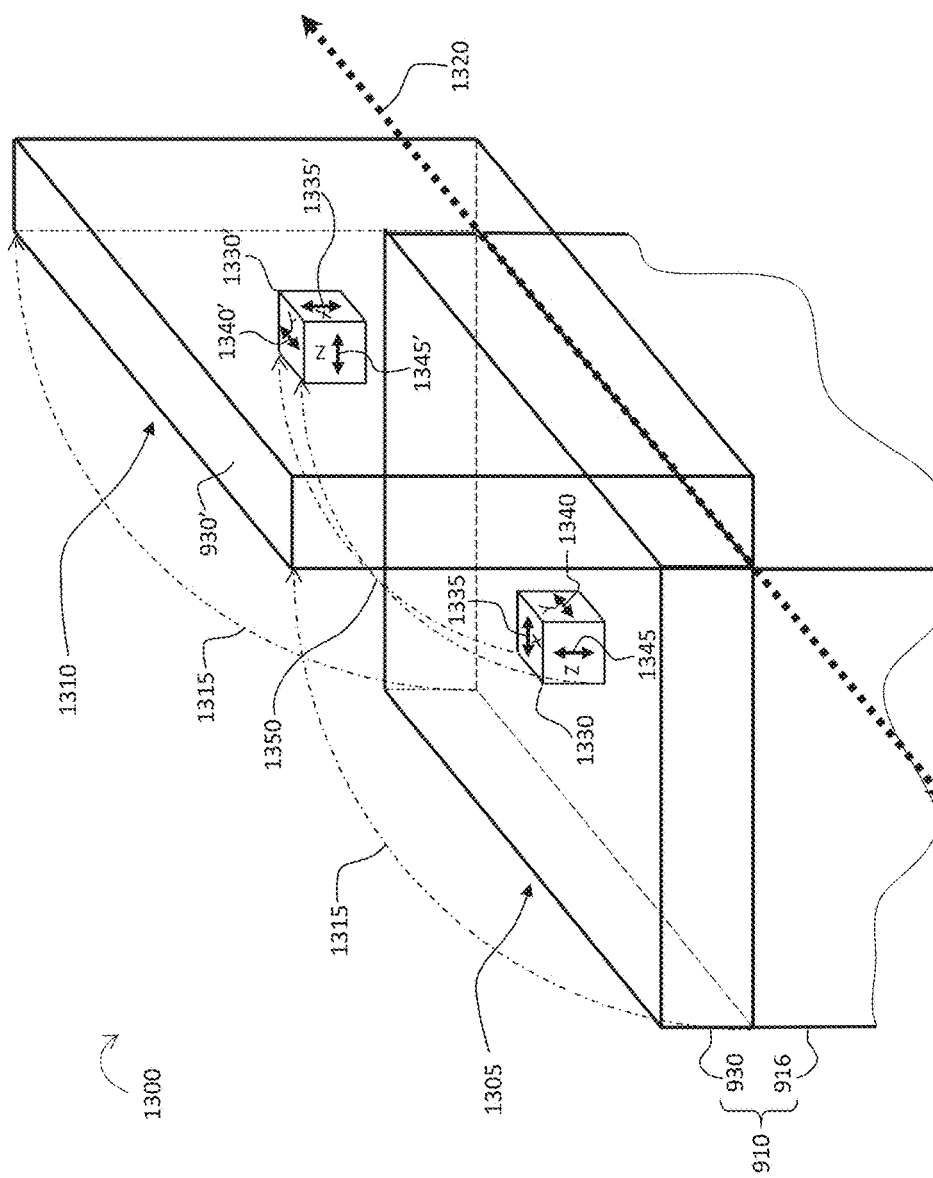

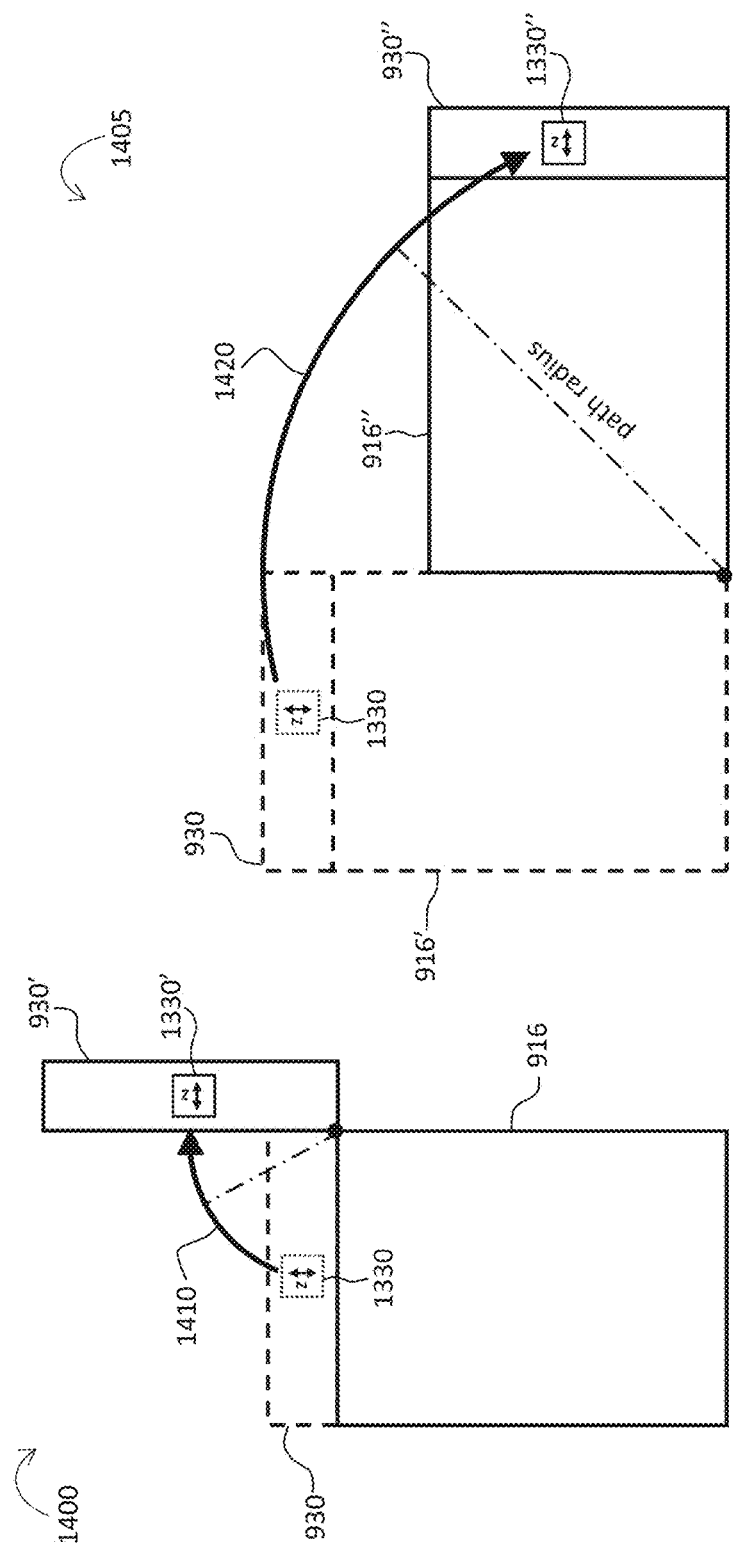

SOLAR ENERGY-STORAGE COOLER AND ASSOCIATED METHODS

RELATED APPLICATION

The present application is a Continuation-in-Part of U.S. patent application Ser. No. 15/668,866 entitled ADVANCED MOBILE ENERGY STORAGE DEVICE, filed on Aug. 4, 2017, which is incorporated herein by reference in its entirety

BACKGROUND

The present Application relates at least generally to the field of mobile chest-type coolers with energy storage and solar coolers with energy storage, more particularly, a solar energy-storage cooler and associated methods.

Applicants recognize there is a need for improvement in the supply of electrical energy in places and situations where connection to the electrical grid is inconvenient or impractical. Examples of these situations include construction sites, outdoor recreation such as camping, and emergencies such as the aftermath of storms. The prior-art has attempted to provide at least somewhat effective solutions using fossil fuel powered generators, with their incumbent detractions such as noise, exhaust, size, maintenance requirements, and the like. Portable generators for these situations usually supply a replacement grid connection: for example, 120-volt ac outlets. In addition, there has been a recent explosion in the market for mobile devices such as music players, LED lights, and wireless communication devices such as cellphones and tablets, among others. These mobile devices are typically powered by batteries, which need to be recharged, expanding the need and applications for the supply of electrical energy in off-grid situations.

Applicants further recognize that improvements in the size and cost of dc-to-ac converters, or inverters, have made practical the use of batteries to replace generators in these situations. A battery/inverter solution has many advantages over the detractions associated with fossil fuel powered generators: it is quiet, clean, more reliable, and can be much smaller, lighter, and more portable. Furthermore, recent improvements in battery chemistries have produced much higher energy storage densities, further enhancing the mobility of a battery/inverter supply. Batteries, even high energy density technologies, store only a finite amount of energy and therefore are in need of periodic recharge. The usual way this is done is with a charging circuit that is connected, at least temporarily, to the electrical grid, commonly through a 120-volt ac outlet. The charging circuitry can be incorporated into the same structure with the battery and inverter and this has led to the mobile energy storage device. The MESD (Mobile Energy Storage Device) has become a popular solution for applications ranging from single-digit watt, pocket-sized devices to multi-kilowatt generator replacements.

FIG. 1 is a block diagram that illustrates a prior-art mobile energy storage device, or MESD, generally indicated by the reference number 100. Electrical energy is stored in a rechargeable battery 101 of any suitable chemistry. The energy is made available for use by external devices on an ac power output 102, a USB (i.e., 5 volts) output 103, and a dc output (i.e., 12 volts) output 104. The battery can be recharged by connecting an ac power input 105 of the MESD to the electrical grid, (plugging it in to an electrical outlet). Some prior-art mobile energy storage device embodiments have an additional dc power input 106, frequently a 12-volt input suitable for connecting to the electrical system of an automobile, allowing recharging in locations without an electrical grid connection. Frequently, there are user controls 107 to provide functions such as the enabling/disabling of power outputs and the starting/stopping of recharging through the power inputs. There is also frequently a display 108 indicating to the user the status of the power inputs and outputs. The display can also indicate the state of charge (SOC) of the battery, i.e. the amount of energy stored within the battery. This is often indicated as a fraction of the capacity of the battery. Applicants observe that displaying the SOC when a mobile energy storage device is powering external devices can be of little value, as will be discussed at appropriate points below. Applicants further recognize that mobile chest-type coolers are used in situations similar to those in which mobile energy storage devices are used, namely temporary and off-grid situations. Both coolers and energy storage devices can be heavy: from ice in the one and batteries in the other. Both devices can also be bulky, which, when combined with weight, hampers their mobility. Users of these devices desire to reduce the size and number of objects that must be moved to set-up and tear-down these temporary off-grid sites. In addition, Applicants recognize that there is a need in mobile devices for improvement in security against theft. Applicants recognize that the prior-art has not sufficiently addressed these issues. However, the advancements that have been brought to light hereinafter both sweep aside these problems and concerns as well as provide new advantages to users. Accordingly, the foregoing examples of the related art and limitations related therewith are intended to be illustrative and not exclusive. Other limitations of the related art may become apparent to those of ordinary skill in the art upon a reading of the specification and a study of the drawings.

SUMMARY

The following embodiments and aspects thereof are described and illustrated in conjunction with systems, tools, and methods which are meant to be exemplary and illustrative, not limiting in scope. In various embodiments, one or more of the problems described above and throughout this disclosure have been reduced or eliminated.

In one aspect of the present disclosure, an embodiment of an advanced mobile energy storage device and associated methods are described. The advanced mobile energy storage device includes an energy storage component for the storage of electrical energy and characterized by a state of charge representative of an amount of energy stored within the component and by an energy storage rate into and out of the energy storage component. At least one power input is provided through which electrical energy is transferable into the storage device for at least storage within the energy storage component. At least one power output is provided through which electrical energy is transferable out of the storage device from at least the energy storage component. A processor determines, for indication to a user, an estimate of time until the state of charge at least reaches one or more particular levels, the estimate determined at least from the state of charge in conjunction with the energy storage rate.

In another aspect of the present disclosure, another embodiment of an advanced mobile energy storage device and associated method are described. The advanced mobile energy storage device includes an energy storage component for the storage of electrical energy and is characterized by a state of charge representative of an amount of energy stored within the component and by an energy storage rate into and out of the energy storage component. At least one power input is provided through which electrical energy is transferable into the storage device for at least storage within the energy storage component. At least one power output is provided through which electrical energy is transferable out of the storage device from at least the energy storage component. A network interface is configured for communication over a wireless network with at least an external computing device. A processor cooperates with the external computing device to determine, for indication to a user, an estimate of time until the state of charge at least reaches one or more particular levels, the estimate determined is at least based on the state of charge in conjunction with the energy storage rate.

In still another aspect of the present disclosure, still another embodiment of an advanced mobile energy storage device and associated method are described. The advanced mobile energy storage device includes an energy storage component for the storage of electrical energy. At least one power output is provided through which electrical energy is transferable out of the storage device from at least the energy storage component. At least one power input is provided through which electrical energy is transferable into the storage device at least for storage within the energy storage component. A processor is configured to determine adjustment information, for use by a user of the storage device, to adjust a current orientation of a solar power source to a recommended orientation such that a predicted amount of solar energy collectable over a given time period subsequent to the adjustment is greater than another predicted amount of solar energy that would otherwise be collected at the current orientation for the given time period.

In a continuing aspect of the present disclosure, a solar energy-storage cooler and associated methods are described. An embodiment of a solar energy-storage cooler includes a mobile thermally insulating housing that defines an interior, an opening for access to the interior, and includes a lid that is movable between a closed position that seals the opening and an open position for access to the interior. The housing can further define a secure compartment separate from the interior. At least one solar power source is configured to convert solar energy to electrical energy, with the solar power source supported by the housing. An energy storage device is supported by the housing and includes: (i) an energy storage component for the storage of electrical energy, (ii) at least one power input through which electrical energy is transferable from the solar power source at least for storage within the energy storage component, (iii) at least one power input through which electrical energy is transferrable into the solar energy-storage cooler at least for storage within the energy storage component, and (iv) at least one power output through which electrical energy is transferrable out of the energy storage cooler at least from the energy storage component. A compartment door is configured for selective movement between a first position that closes the secure compartment and a second position for access to the secure compartment. A lock mechanism is configured for locking the compartment door in the first, closed position to limit unauthorized access to the compartment. The lock mechanism can be operable in response to an electrical signal.

In a further aspect of the present disclosure, another embodiment of a solar energy-storage cooler and associated methods are described in which a mobile thermally insulating housing defines an interior, an opening for access to the interior, and includes a lid movable between a closed position that seals the opening and an open position for access to the interior. At least one solar power source is configured to provide electrical energy from converting solar energy received from the sun, with the solar power source supported by the housing. An energy storage device is supported by the housing and includes: (i) an energy storage component for the storage of electrical energy, (ii) at least one power input through which electrical energy is transferable from the solar power source at least for storage within the energy storage component, (iii) at least one power input through which electrical energy is transferrable into the solar energy-storage cooler at least for storage within the energy storage component, and (iv) at least one power output through which electrical energy is transferrable out of the energy storage cooler at least from the energy storage component. A motion sensor, supported by the housing, senses at least one of linear acceleration, rate of rotation, and magnetic field strength for producing one or more motion sensor outputs responsive thereto to characterize motion of the housing.

In an additional aspect of the present disclosure, still another embodiment of a solar energy-storage cooler and associated methods are described in which a mobile thermally insulating housing defines an interior, an opening for access to the interior, and includes a lid movable between a closed position that seals the opening and an open position for access to the interior. At least one solar power source is configured to convert solar energy to electrical energy and is supported by the housing. An energy storage device is supported by the housing including:

- an energy storage component for the storage of electrical energy and characterized by a state of charge representative of an amount of energy stored within the energy storage component and by an energy storage rate into and out of the energy storage component;
- at least one power input through which electrical energy is transferable from the solar power source at least for storage within the energy storage component;
- at least one power input through which electrical energy is transferable into the solar energy-storage cooler at least for storage within the energy storage component;
- at least one power output through which electrical energy is transferable out of the solar energy-storage cooler at least from the energy storage component; and
- a processor is configured for at least one of (i) determining an estimate of time until the state of charge at least reaches one or more particular levels at least based on the state of charge in conjunction with the energy storage rate and for generating an indication of the estimate, (ii) cooperating with an external computing device for determining the estimate, and (iii) cooperating with the external computing device for generating the indication.

In another aspect of the present disclosure, yet another embodiment of a solar energy-storage cooler and associated methods are described in which a mobile thermally insulating housing defines an interior, an opening for access to the interior, and includes a lid movable between a closed position that seals the opening and an open position for access to the interior. At least one solar power source is supported by the housing and is configured to convert solar energy to electrical energy. An energy storage device is supported by the housing including: (i) an energy storage component for the storage of electrical energy; (ii) at least one power input through which electrical energy is transferable from the solar power source at least for storage within the energy storage component; (iii) at least one power input through which electrical energy is transferrable into the solar energy-storage cooler at least for storage within the energy storage component; and (iv) at least one power output through which electrical energy is transferrable out of the solar energy-storage cooler at least from the energy storage component. At least one temperature sensor is supported by the housing to measure a temperature to generate a temperature signal relating to the interior of the housing. A processor is configured for receiving the temperature signal and for at least one of indicating the temperature to a user and to cooperating with an external computing device for indicating the temperature to a user.

In still another aspect of the present disclosure, embodiments of a chest-type cooler and associated methods are described in which a mobile thermally insulating housing defines an interior, an opening for access to the interior, and includes a lid hingedly rotatable on a hinge axis between a closed position that seals the opening and an open position for access to the interior. The housing further defines a secure compartment that is separate from the interior. A compartment door is hingedly rotatable on the hinge axis between a first position at which the compartment door closes the secure compartment and a second position at which the compartment door is open for access to the secure compartment, independent of the position of the lid. A lock mechanism can lock the compartment door in the first position to limit unauthorized access to the secure compartment.

BRIEF DESCRIPTION OF THE DRAWINGS

Example embodiments are illustrated in referenced figures of the drawings. It is intended that the embodiments and figures disclosed herein are to be illustrative rather than limiting.

FIG. 4 is a graph of the rate of energy flow as a function of time illustrating various features of an example waveform of the energy storage rate in an embodiment of an advanced mobile energy storage device (AMESD).

FIG. 5A is a block diagram of an embodiment of a mobile energy storage system incorporating an AMESD and configured for charging from a power source in accordance with the present disclosure.

FIG. 5B is a block diagram of another embodiment of a mobile energy storage system incorporating the AMESD of FIG. 5A and being used to supply electrical energy to powered devices in accordance with the present disclosure.

FIG. 13 is a diagrammatic, fragmentary perspective view of an embodiment of a solar energy-storage cooler, depicted with its lid both in the closed position and the open position, and showing details with regard to using a multi-axis accelerometer to detect lid-closure, in accordance with the present disclosure.

FIGS. 14A and 14B are diagrammatic, elevational views of the solar energy-storage cooler of FIG. 13, shown here to highlight the difference between a lid opening and a tip-over of the cooler, respectively, for purposes of distinguishing therebetween in detecting lid-closure, in accordance with the present disclosure.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents, as defined within the scope of the appended claims.

Figure 1:
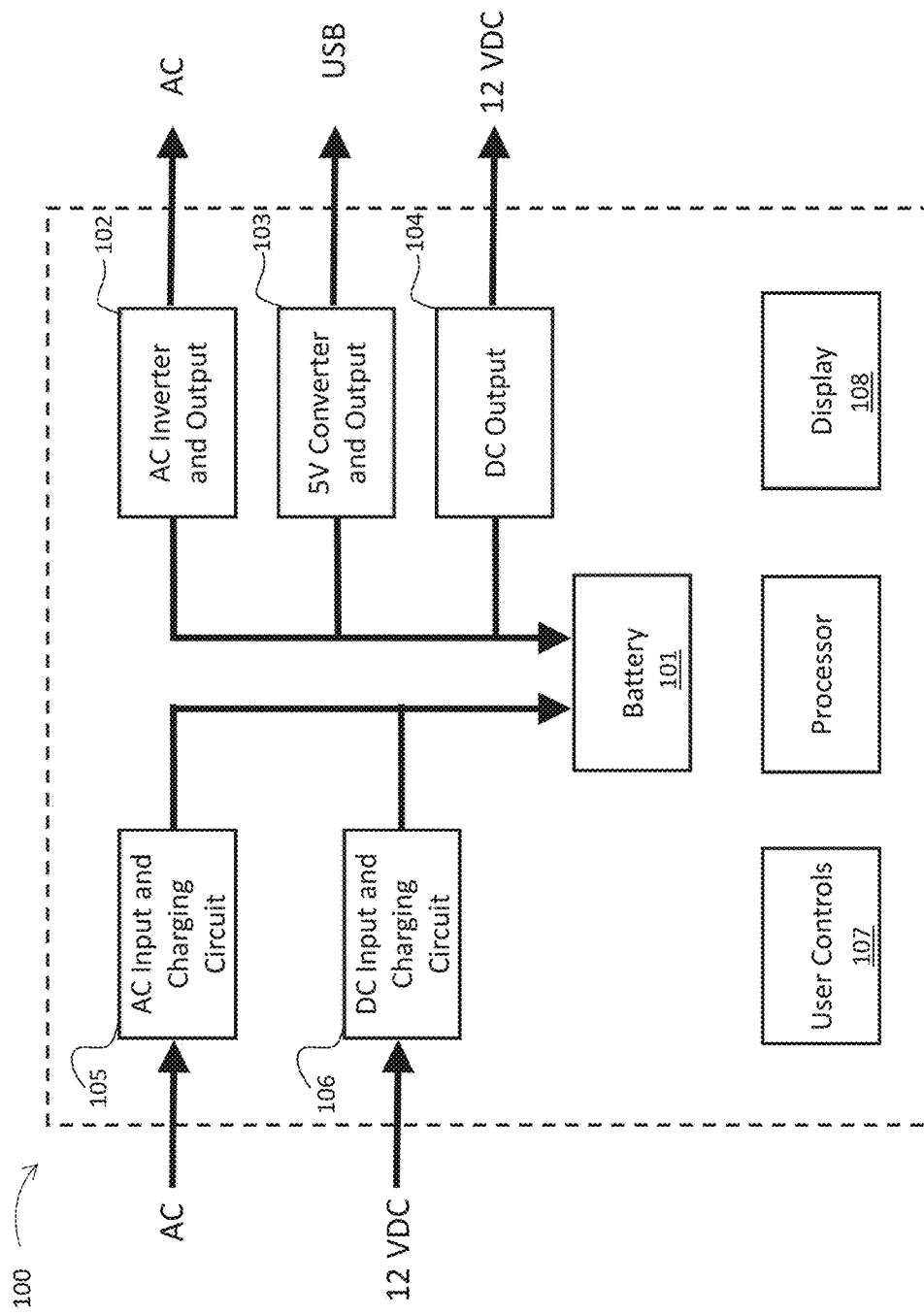
FIG. 1 is a block diagram generally illustrating an example of a prior-art mobile energy storage device (MESD).
Figure 2:
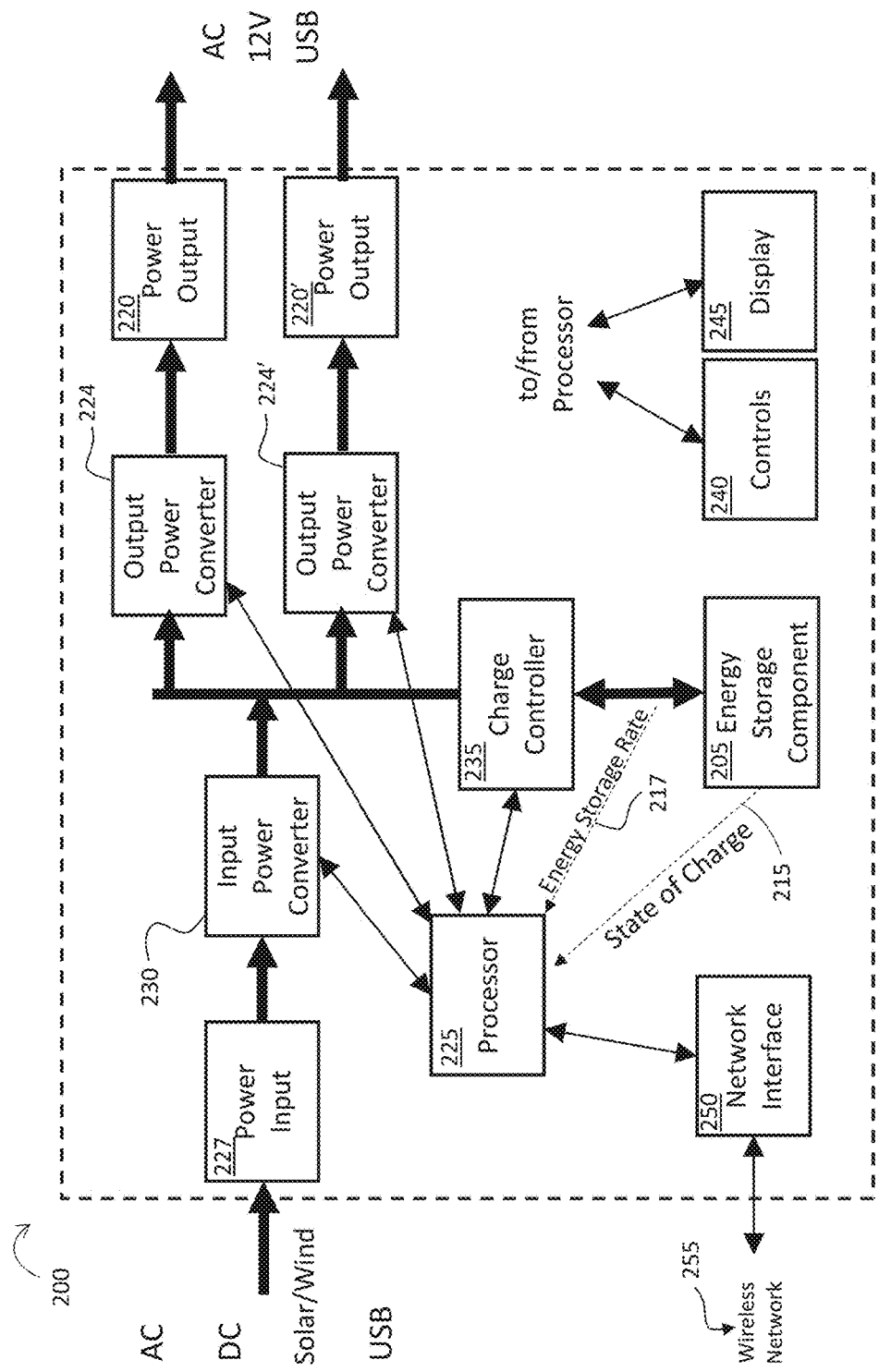
FIG. 2 is a block diagram of an embodiment of an advanced mobile energy storage device (AMESD) in accordance with the present disclosure.

Applicants hereby describe an Advanced Mobile Energy Storage Device, hereinafter AMESD. An AMESD stores electrical energy so that it can be supplied in locations where connection to the electrical grid or another source of electrical power is not possible or is inconvenient. Attention is directed to FIG. 2 which is a block diagram of an embodiment of an AMESD produced in accordance with the present disclosure and generally indicated by the reference number 200. Within the AMESD, electrical energy is stored in an energy storage component 205. It is noted that like reference numbers may be used to reference like components throughout the figures.

Energy storage component 205 is rechargeable: electrical energy can be transferred into it for storage before the AMESD is located on site, for example, at a location that is isolated from the power grid, and once on-site, electrical energy can be supplied for use by external device(s) by transferring electrical energy back out. (External powered devices are not shown in the figure). In one embodiment, energy storage component 205 is a 14.8-volt, 1250-watt-hour, rechargeable lithium-ion (Li—NiMnCo) battery and, in another embodiment, a 3.7-volt, 70-watt-hour, rechargeable lithium-ion (Li—Co) battery. Other battery technologies can be used, such as AGM (Absorbent Gas Mat) lead-acid and gel-cell lead-acid, without limitation. Applicants observe that flooded lead-acid batteries have a disadvantage; these batteries have limits on their orientation. Rechargeable energy storage technologies other than batteries can be used in energy storage component 205, each with their associated advantages and disadvantages. Other rechargeable technologies can include such things as supercapacitors and fly-wheels, without limitation.

Energy storage component 205 is characterized by an energy capacity and a state of charge 215, the latter of which is diagrammatically indicated as a monitoring line. The energy capacity indicates the maximum amount of energy that will be stored within energy storage component 205. This can be measured in any suitable energy units such as joules, amp-hours (assumes a fixed voltage), watt-hours, etc. State of charge 215 is representative of the amount of energy presently stored within energy storage component 205 and can be expressed relative to the energy capacity, frequently as a percentage. The energy storage component is also characterized by an energy storage rate 217, which is indicated by a monitoring line, of electrical energy into and out of the energy storage component. The energy storage rate can be measured in any suitable units such as joules/sec, watts, amps (assuming a fixed voltage), etc. The present disclosure will use a sign convention of positive for energy storage rate to indicate electrical energy is flowing into (charging) the energy storage component. Applicants note that the rate of flow of electrical energy can also be referred to as power. This disclosure preferentially uses energy terminology (and therefore flow of energy terminology) for consistency and clarity.

When AMESD 200 is used to supply electrical energy to external devices (not shown for purposes of illustrative clarity), the energy can be supplied by a power output through which electrical energy is transferrable out of the AMESD from energy storage component 205. Applicants note that throughout the present disclosure, in addition to the various forms of the term 'transfer through' when describing the flow of electrical energy through power outputs, the corresponding forms of the terms 'source' and 'supply' can be used interchangeably. There are two power outputs depicted in FIG. 2, indicated by reference numbers 220 and 220'. In other embodiments, the number of power outputs can be fewer or greater, depending on the application. Different types of power outputs can be used to supply different voltages and interconnections for different applications. For example, power output 220 can be one type: a conventional electrical outlet that supplies 120 volts ac. Power output 220' can be another type: one that provides 5 volts dc on a USB connector for applications such as recharging mobile electronics. In different embodiments, power outputs such as 220 and 220' can be other types, such as a standard 12-volt connector. (The standard 12-volt connector supplies high-power, high-current 12 volts dc that mimics an automotive power outlet). It should be noted that a power output of any particular type can have more than one connector, expanding the number of external devices to which the output can directly connect. It should be further noted that the examples provided are not intended to be limiting; practitioners skilled in the art will be able to provide other embodiments as applications warrant.

The electrical energy to power outputs 220, 220' can be supplied by output power converters. There are two output power converters depicted in FIG. 2, indicated by reference numbers 224 and 224'. In this embodiment, there is one output power converter for each power output, but this is not a requirement. Each output power converter can transform electrical energy into the appropriate voltage and current waveforms required for the power output being supplied. Power outputs can be protected against overloads and misconnections using well known techniques, such as current limiting, voltage clamping, and short-circuit protection. The protection circuits can be implemented in the output power converter and/or the power output.

Stored electrical energy can be provided to an output power converter (224 or 224') from energy storage component 205. In one embodiment, wherein the energy storage component comprises a 14.8-volt lithium-ion battery, this voltage is nominally 14.8 volts dc. The required function of the output power converter depends upon the requirements of the power output. If the power output supplies a dc voltage, then the output power converter can function as a power supply and techniques such as dc-to-dc converters can be employed. If ac voltage is supplied, then inverter technology can be used. In some instances, when no voltage level transformation is required, no output power converter need be utilized; the input power can be directly connected to an appropriate power output.

Each output power converter (224 or 224') can be controlled by a processor 225. The processor can enable or disable the output power converters, determining to which power output (220 or 220') electrical energy will flow. In some embodiments, more than one output power converter can be enabled simultaneously, allowing more than one power output to supply electrical energy at the same time. In addition to enablement, the processor can adjust an output power converter to control the characteristics of a power output. For example, in embodiments where the output power converter comprises a dc-to-dc converter, the duty cycle can be adjusted to control the voltage and current. In embodiments where the output power converter comprises an inverter, the processor can adjust the frequency, voltage level, and current level of the ac voltage supplied by the power output. The processor can also enable, disable and/or adjust the protection circuits discussed earlier.

Electrical energy can be transferred into AMESD 200 through a power input 227 for storage in energy storage component 205. Different types of power inputs can be used to accept electrical energy from different voltages and different interconnections. Applicants note that, when describing the flow of electrical energy through power inputs in the present disclosure, various forms of the terms 'accept' and 'receive' can be used interchangeably with corresponding forms of the terms 'transfer into' or 'transfer through'. One example type of power input can accept a standard 12-volt dc connector plug. This can allow the AMESD to be charged from automobiles. It should be noted that the voltage on standard 12-volt dc connectors can differ significantly from 12 volts. When an automobile is charging, for example, the voltage can run several volts higher. A different example type of power input can connect to 120 volts ac. In this type of power input, the use of an appropriate standardized receptacle, such as one compliant with IEC320 C13, can allow insertion of a detachable modular power cord for connection to a conventional electrical outlet. In still another type, a power input can accept power from a low dc voltage source such as, for example, 5 volts from a USB connector. In the embodiment of an AMESD depicted in the figure, only one power input is shown, although this is not a requirement. In other embodiments, two or more power inputs can be present that can be of different types.

Continuing to reference the block diagram of the AMESD 200 of FIG. 2, the electrical energy from power input 227 enters an input power converter 230. For purposes of illustration and not limitation, there is one input power converter depicted. Other embodiments can comprise more than one input power converter. Embodiments can have one input power converter for each power input, as depicted in the figure, or the numbers can differ. In some embodiments, multiple power inputs can share a single input power converter. In other embodiments, multiple input power converters can be connected to a single power input. Input power converter 230 can transform electrical energy so that the energy is appropriate for transfer into energy storage component 205 for storage. In one example embodiment, energy storage component 205 is a 14.8-volt lithium-ion battery. Input power converter 230 can use well-known power supply technology, such as dc-to-dc switching converter technology, to transform the voltage level from power input 227 to the 14.8 volts needed at the energy storage component. When the power input accepts ac voltages, corresponding input power converter 230 can use appropriate known techniques for transforming the voltage to dc before transferring the electrical energy to energy storage component 205 for storage. Such techniques can include, without limitation, rectification, filtering and dc-to-dc conversion. The input power converter can be protected against damage from over-voltages and reverse voltages by use of customary protection circuits. These protection circuits, such as diode voltage clamps and transorbs, can be placed in the power input or the input power converter.

Input power converter 230 can be controlled by processor 225. The processor can control input power converter(s) in ways that are similar to the control of output power converters, as discussed earlier. The processor can enable or disable individual input power converters, such as input power converter 230. Processor 225 can also adjust the acceptable voltage range for power inputs, such as power input 227, and the voltage supplied to energy storage component 205. In embodiments where the input power converter employs a dc-to-dc converter, this can be accomplished, for example, by adjusting the duty cycle of the dc-to-dc converter. The processor can also enable, disable and/or adjust the input protection circuits discussed above.

Continuing the discussion of FIG. 2, the electrical energy leaving input power converter 230, now at the appropriate voltage, passes through a charge controller 235. The charge controller, in an embodiment with assistance from processor 225, monitors state of charge 215 of the energy storage component 205. Suitable arrangements for monitoring the state of charge depend on the technology choice for the energy storage component. For example, if an embodiment of an AMESD 200 uses a super-capacitor for the energy storage component 205, the amount of stored energy is proportional to the square of the voltage across the super-capacitor. Accordingly, the charge controller 225 can determine the state of charge by measuring the voltage across the energy storage component 205.

In another embodiment, energy storage component 205 is a lithium-ion battery. There are many well-known techniques that can be used to determine state of charge 215 by measuring the voltage across and/or the current into and out of the energy storage component 205, each with their individual advantages and disadvantages. One of these techniques, coulomb counting, can be used by measuring the current through the charge controller 235 as it enters and leaves the energy storage component 205. The current can be integrated over time by processor 225 to determine the amount of charge (measured in coulombs or amp-hours) remaining in the energy storage component. The ratio of this result to the energy capacity determines the state of charge. Energy storage rate 217 can also be determined by measuring the current through charge controller 225 using the equation Energy Storage Rate=Power=Battery Voltage*Current.

Processor 225 and charge controller 235 can cooperate to control the charging process for energy storage component 205. The charging rate, i.e. energy storage rate 217 of electrical energy into the energy storage component, can be measured in the charge controller and fed-back by the processor to input power controller 230. In embodiments where the input power controller is comprised of a dc to dc converter, this can be accomplished by adjusting the duty cycle of the converter using well understood control system techniques. The energy storage component can be prevented from overcharge by monitoring state of charge 215 and halting or reducing the input power converter. Additionally, the processor can vary the charge rate as the state of charge increases in a similar way.

As previously discussed, when power is being supplied to AMESD 200, energy flows out of input power converter 230 and into (charging) energy storage component 205. In this case, energy storage rate 217 is positive. When the AMESD is supplying power, the energy flows out of (discharging) the energy storage component and into output power converter 224 and/or 226, depending on which power outputs 220 and/or 222 are energized. In this case, the energy storage rate is negative. The AMESD can be both charging and supplying power at the same time. Energy storage rate 217 is the net flow rate of electrical energy into or out of energy storage component 205. The rate can be positive or negative depending on whether the charging energy flow rate is greater than the discharging energy flow rate, i.e. whether the energy is being supplied out from the power output faster than the energy is being sourced in through the power input. In embodiments of the AMESD with multiple power inputs and/or power outputs, electrical energy can flow inward from one or more input power converters and outward into one or more power converters. The energy storage rate is the sum of the positive energy flow rates from the energized input power converters and the negative energy flow rates into the energized output power converters, neglecting any losses.

AMESD 200 can have a network interface 250 allowing it to connect to a wireless network 255, such as WIFI or Bluetooth, allowing the AMSED to communicate with other devices (not shown). The wireless network can also include a direct radio link to another device. In this embodiment, the network interface is controlled by processor 225. Connection to a wireless network can allow the AMESD to be controlled by and communicate status to some other device on the network (not shown). Connection to a wireless network can also allow the AMESD to connect through it to the internet (not shown), as will be discussed in greater detail later in the present Application.

Controls, indicated by reference number 240, can allow the user to control and configure the AMESD. The controls can be positioned in any suitable location such as, for example, on the front panel of AMESD 200. Examples of functions performed by controls 240 can include turning on (enabling) and turning off (disabling) specific power inputs 227 and power outputs 220 and 222, enabling and disabling protection input/output protection circuits and features, and changing parameters such as setting the maximum current (power) levels for power inputs and outputs.

Processor 225 can indicate to the user the status of the AMESD via a display 245. The status displayed can include, for example, indicating which power inputs and power outputs are currently enabled and the flow rate of electrical energy (power) through them. The operating state of energy storage component 205 can also be indicated, such as the energy storage rate 217 and state of charge 215. Controls 240 can be combined with the display in the form of a touchscreen: allowing the user to conveniently control functions (such as enabling, disabling, changing parameters) by touching an icon on the display rather than by interacting with a separate button, switch, or dial.

Figure 3:
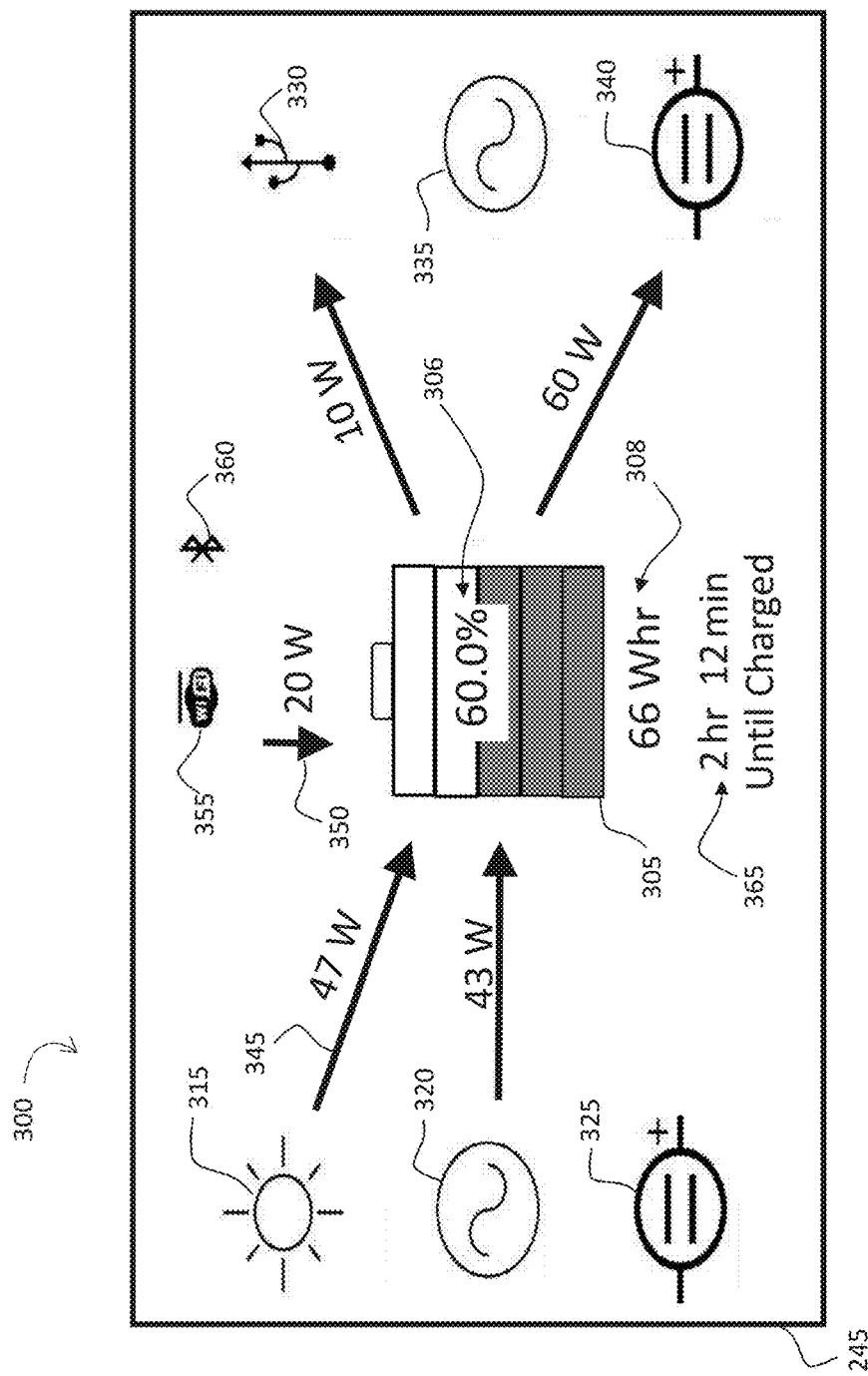
FIG. 3 is a diagrammatic representation of an embodiment of a screen shot of the display of an advanced mobile energy storage device (AMESD) produced in accordance with the present disclosure.

The reader's attention is now directed to FIG. 3, which depicts an embodiment of a screen shot 300 of display 245, (which can be a touch-screen). A practitioner of ordinary skill in the art will realize that the display screen shot depicted is just one of a great many possible that are in keeping with the teachings and spirit of this Application and that the specifics of this example should in no way be considered as limiting. The screen depicts a diagrammatic representation of AMESD 200 (FIG. 2). In the center of the screen, an icon of a battery 305 represents energy storage component 205 (FIG. 2). A percentage 306 in battery icon 305 and a watt-hour indication 308 indicate state of charge 215 (FIG. 2) of the energy storage component. Battery bars that form part of battery icon 305 can utilize color to indicate the state of charge, for example, with green indicating available energy. In the present example, icon 305 depicts a 60% state of charge which equates to 66 watt hours of energy. The energy storage component of the present embodiment has a capacity of 120 watt-hours, of which 66 watt-hours is 60%. Icons identified by reference numbers 315, 320, and 325 represent the Solar, AC, and 12V DC power inputs into the AMESD respectively. Likewise, icons identified by reference numbers 330, 335, and 340 respectively represent USB, AC and 12V DC power outputs, respectively. These icons can individually indicate the state of the corresponding input or output visually, such as by graying out or changing color when not enabled. Arrows can be used to indicate energy flow. For example, an arrow 345 indicates energy flow from the solar power input into the energy storage component. When energy flow is present, arrow 345 can be displayed, pointing in the appropriate direction. When no energy is flowing, the arrow can be greyed out or blanked. The thickness or boldness of the arrow can correspond to the amount of energy that is flowing. In other embodiments, the arrow can blink or animate to indicate that energy is flowing, the blink rate or animation speed indicating the amount of energy flow. Arrows can be labeled to indicate the amount of energy flowing. In the present embodiment, arrow 345 indicates that 47 watts is currently flowing from the solar power input to the energy storage component. It is noted that the flow relating to any electrical energy path within the AMESD can be illustrated in accordance with these as well as any other suitable conventions. For example, an arrow 350 can indicate the direction and magnitude of the energy storage rate. (The energy storage rate is the net amount of energy flowing into or out of the energy storage component. See reference number 217 in FIG. 2). Arrow 350, in this instance, indicates a net inward flow and the label on the arrow indicates 20 watts of electrical energy is flowing.

Display 245 can also use icons to indicate network connectivity. For example, in screen shot 300 in FIG. 3, the depiction of a WIFI icon 355 and a Bluetooth icon 360 can indicate that the AMESD is connected to the corresponding wireless network. The icons can also be blanked, grayed out, or change color to indicate the status of the network connection, such as disconnected or error.

Having described aspects of embodiments of the advanced mobile energy storage device of the present disclosure in detail above, it is appropriate at this juncture to now bring to light certain deficiencies of the prior-art that are submitted to remain unresolved and which are addressed herein with regard to indicating the State of Charge (SOC) to the user. For example, when recharging an AMESD, it is of interest to the user to know the amount of time remaining until the AMESD is charged and can be disconnected and put into use. This time can be difficult to estimate as the recharge rate can be limited by the AMESD (for instance by the battery technology being used) and/or by the power source to which it is connected. Applicants additionally note that the estimation of such times can be further complicated when the AMESD is being used to power an external device while it is being charged, or when multiple external devices are in use at the same time, or when multiple power sources are being used to recharge at the same time. As another example, when an AMESD is supplying power to an external device, one cannot rely on the listed or label power rating of the external device since this value is usually an absolute maximum value and not a good indication of the actual power being used. As will be discussed immediately hereinafter, Applicants believe that these concerns have been resolved.

Continuing now with reference to FIG. 3, display 245 can also indicate an estimate of time 365 until the energy storage component's state of charge reaches a particular level. In the example screen depicted, the estimate of time illustrated is 2:12 (2 hours 12 minutes). This indicates, by way of non-limiting example, that the time remaining until the state of charge equals the particular level of 100%, (i.e. the energy storage component is fully charged), is estimated to be 2 hours and 12 minutes.

In one embodiment, estimate of time 365 can be based on the assumption that energy storage rate 217 (FIG. 2) will continue at its present value. In this case, future values of state of charge 215 (FIG. 2) can be estimated using a first order approximation. Applying the particular level that the state of charge needs to reach to this approximation results in an equation the can be implemented by processor 225 to calculate the estimate of time. For the particular levels of full and empty, this results in implementing the following equations:

$$t_{empty}[\text{sec}] = \frac{SOC}{r_{storage}} \left[ \frac{\text{joules}}{\text{joules/sec}} \right] \quad \text{[EQN 1]}$$

$$t_{full}[\text{sec}] = \frac{\text{Capacity} - SOC}{r_{storage}} \left[ \frac{\text{joules}}{\text{joules/sec}} \right] \quad \text{[EQN 2]}$$

where:

$t_{empty}$=time remaining until stored energy=0 [units=sec]
$t_{full}$=time remaining until stored energy=max [units=sec]
SOC=State Of Charge (amount of stored energy) [units=joules]
$r_{storage}$=rate of energy into storage [units=joules/sec (watts)]
Capacity=max energy that can be stored [units=joules]

When supplying energy to various devices, the amount of current drawn by the devices can change. Even with the output voltage held constant, changing current changes the power (rate of energy flow) supplied and therefore affects estimate of time 365. These changes can take place over a longer time scale as the function of the device consuming the energy changes. For example, starting or stopping a tool, or turning on a light, can change the power for a time-period of seconds or minutes, affecting energy storage rate 217 (FIG. 2) over a long time scale. Changes to the current drawn from the AMESD can also occur over shorter time scales. For example, the current drawn by sections of circuitry as they are used and unused can vary over a time scale of 10's of milliseconds or shorter.

Referring now to FIG. 4, a graph 400 of energy storage rate 217 (FIG. 2) for an embodiment of an AMESD is shown. Vertical axis 405 indicates, at some appropriate scale, the energy storage rate [joules/sec or watts] at each point in time. Horizontal axis 410 indicates time [sec], also at some appropriate scale. A waveform 415 is shown as a solid line that represents the instantaneous values of the energy storage rate at each point in time. Average level lines 420 and 425, depicted as dashed horizontal lines, each indicate an average value of the energy storage rate. Lower average level line 420 indicates an approximate average of the energy storage rate during an initial portion of waveform 415. Higher average level line 425 indicates the approximate average during the later portion of the waveform.

In the earlier discussion, with reference to FIG. 2, embodiment 200 of the AMESD measures energy storage rate 217 in charge controller 235. This can be implemented as an ADC (Analog to Digital converter) that measures samples of the instantaneous energy storage rate at spaced apart points in time. The charge controller can report the measured samples to processor 225, which can use these values to determine estimate of time 365 (of FIG. 3) for indication to a user of the AMESD on display 245.

Returning to the graph of FIG. 4, measured samples 430 of the instantaneous energy storage rate are indicated by dots on waveform 415. Applicants observe, in this example, waveform 415 shows that energy storage rate 217 (FIG. 2) changes significantly over the shorter time scale of sample to sample. If estimate of time 365 is determined for every sample of the energy storage rate, then the estimate will constantly change, making it difficult for the user to comprehend. Processor 225 can instead determine the estimate of time using a series of measurement samples, such as by determining an average of the previous M samples, where M can be chosen to reduce the amount of variation to an acceptable level.

Applicants further observe that the example waveform of FIG. 4 also contains, in addition to the shorter time scale changes just discussed, a significant change over a longer time scale. At time 435, the short term average of samples changes from lower average level 420 to a different, higher average level 425. This change can occur, for example, when a functional change occurs in the device supplied with energy from power outputs 220 and/or 222. Examples of such a functional change can include a tool starting or stopping, a light turning on, or other even more complex changes. The change can also occur if the topology of the energy flow changes, such as when an additional power input or power output is enabled or disabled. If the average of the previous M samples of the energy storage rate is used to determine the estimate of time, as just discussed, the estimate indicated to the user will slowly ramp from one value to another as the average smoothes the step transition. When a transition occurs, the estimate of time can be delayed and be less accurate, making it more difficult for such a functional change to be noticed by the user.

Estimate of time 365 (of FIG. 3) can be further improved with processor 225, in addition to calculating the average over the previous M samples, also continually determining the standard deviation of the previous M' samples. (M and M' are not necessarily the same number of samples and the value of each can be determined empirically in the specific application of an embodiment). When a measured sample of energy storage rate is observed that differs in some multiple, for example, of the continually determined standard deviation, the average value can be reset to the current (i.e., latest) measured sample value of energy storage rate. This causes the estimate of time to quickly respond to a longer time scale transition. The multiple just mentioned can be a non-integer value and can be chosen based on the statistical distribution of the short time frame variation. In this way, the probability of falsely detecting a transition can be reduced to an acceptable level.

Figure 5C:
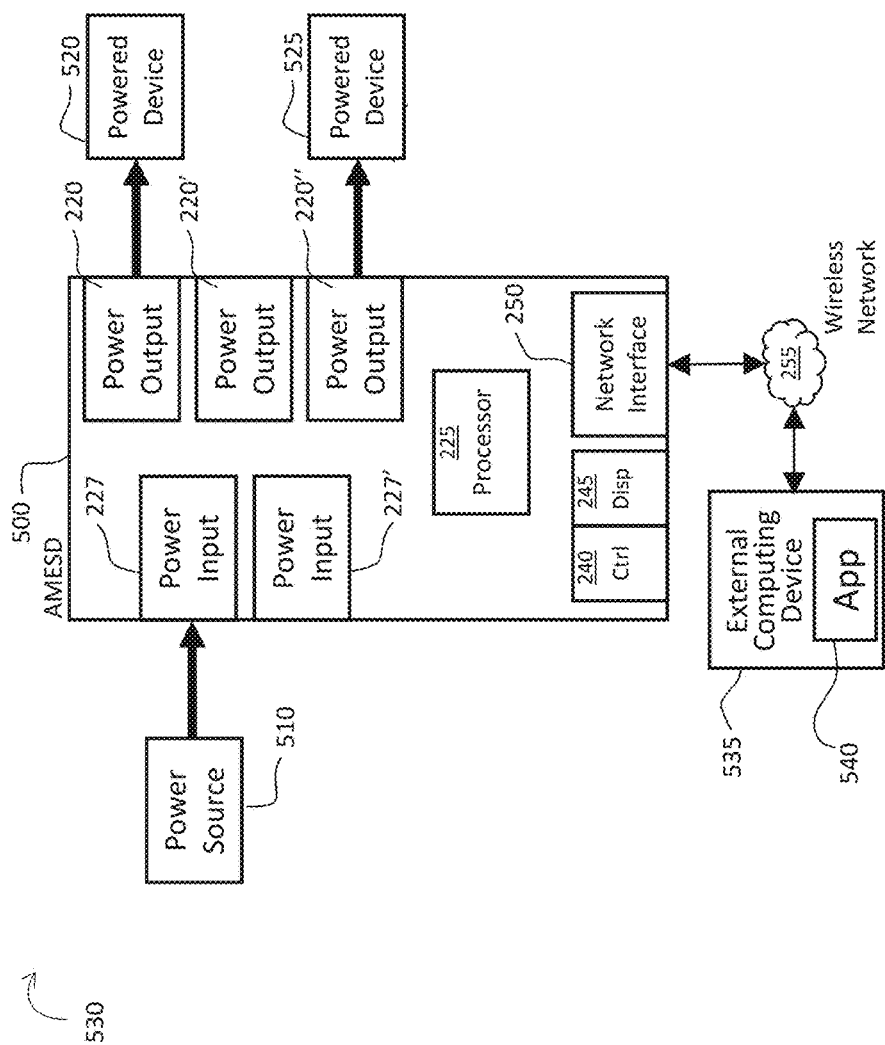
FIG. 5C is a block diagram of still another embodiment of a mobile energy storage system incorporating the AMESD of FIGS. 5A and 5B, that is concurrently receiving and supplying electrical energy in accordance with the present disclosure.

The discussion turns now to FIGS. 5A, 5B, and 5C, each of which depict a block diagram of a mobile energy storage system incorporating an AMESD (Advanced Mobile Energy Storage Device). The AMESD in these figures is indicated by reference number 500 and is another embodiment, in accordance with the present disclosure, of the AMESD that was discussed earlier with respect to FIG. 2. (The embodiment of the AMESD in FIG. 2 is indicated by the reference number 200). In these diagrams, AMESD 500 can include the structure of previously described AMESD 200 of FIG. 2. Accordingly, the present descriptions will be limited to describing differences and the figure is likewise limited to illustrating those differences with components that are not explicitly shown in FIGS. 5A, 5B, and 5C being understood to be present for purposes of brevity.

AMESD 500 depicted in FIGS. 5A, 5B and 5C has two power inputs 227, 227' and three power outputs 220, 220', 220". As mentioned in the earlier discussion, other embodiments of the AMESD can have different numbers of power inputs and power outputs. There can be different types of power inputs and power outputs. In this embodiment of the AMESD, power input 227 is a type configured to receive 120 volts ac electrical energy and power input 227' to receive high current 12 volts dc. Power output 220 is a type configured to supply 120-volt ac electrical energy, power output 220' to supply high current 12 volts dc, and power output 220" to supply 5 volts dc on a USB connector. In different embodiments, the power inputs 227 and 227' and power outputs 220, 220' and 220" can be other types. Corresponding appropriate input power converters and output power converters, as discussed regarding FIG. 2, can be present and are not shown for purposes of brevity and clarity.

Focusing on FIG. 5A, the block diagram of a mobile energy storage system incorporating AMESD 500 is presented and is generally indicated by reference number 505. This embodiment is an example of a mobile energy storage system that can be used for charging an AMESD 500. Mobile energy storage system 505 is configured so that the AMESD receives electrical energy only through power input 227 and power input 227' is disconnected. Power input 227 is connected to a power source 510 and electrical energy can be transferred from the power source into the AMESD through power input 227 for storage within the energy storage component 205 (shown in FIG. 2) of the AMESD. The power source can be a device capable of supplying electrical energy that is configured in such a way as to be compatible with the power input to which it is connected. In this embodiment, the power source can supply 120 volts ac, such as an electrical grid outlet or the output of a portable electric generator. The AMESD also comprises power outputs 220, 220', and 220" through which electrical energy is transferable out of the AMESD from the storage component. In this embodiment, the AMESD is only being charged and is not being used to power any device: power outputs 220, 220', and 220" are not connected.

Moving to FIG. 5B, the block diagram of another embodiment of a mobile energy storage system incorporating the same AMESD 500 is generally indicated by reference number 515. This embodiment is an example of a charged AMESD being used to supply electrical energy. The AMESD in this embodiment is supplying electrical energy to two devices: a powered device 520 and a powered device 525. These powered devices are each respectively connected to power outputs 220 and 220" of the AMESD. Electrical energy can be transferred from energy storage component 205 of the AMESD (shown in FIG. 2) through power output 220 and/or 220" and into powered device 520 and/or 525. Mobile energy storage system 515 is not configured to use power output 220' of the AMESD and it is not connected. A powered device can be configured in such a way as to be compatible with the power output to which it is connected so that it is capable of receiving electrical energy. In this embodiment of the AMESD, power output 220 is configured to supply 120-volt ac electrical energy. Powered device 520 can be configured compatibly, such as a device that can plug into the 120-volt ac power grid. Power output 220" is configured to supply 5 volts dc on a USB connector. Powered device 525 can be configured compatibly, such as cell phone that is rechargeable through a USB connector. The AMESD also comprises power inputs 227, and 227' through which electrical energy is transferable into the AMESD for storage within the storage component. However, this embodiment of a mobile energy storage system is not configured to be charged: power inputs 227 and 227' are disconnected.

FIG. 5C is a block diagram of still another embodiment of a mobile energy storage system incorporating the same AMESD 500, this one generally indicated by reference number 530. This embodiment is an example of an AMESD supplying electrical energy to powered devices 520 and 525 while at the same time receiving electrical energy from power source 510. The power source and powered devices and their corresponding power input and power outputs have been described in the preceding paragraphs regarding FIGS. 5A and 5B.

A detailed explanation of the operation of the power inputs and the power outputs of the AMESD in FIGS. 5A, 5B, and 5C, as well as for the other functional blocks shown comprising the AMESD, can be found in an earlier discussion regarding FIG. 2. Summarizing from that earlier discussion, processor 225 can cooperate with controls 240 and display 245 to allow the user of the mobile energy storage system to interact with the processor to control and monitor the operations of the AMESD. The processor can cooperate with network interface 250 that can be connected to a wireless network 255. The processor can communicate over the wireless network with other devices connected to the network. The wireless networks of mobile energy storage systems 505, 515, and 530 shown in FIGS. 5A, 5B, and 5C, are each connected to an external computing device 535, allowing the processor to communicate over the network to the external computing device. The external computing device can cooperate with the processor to allow the user to control and monitor the operations of the AMESD. This cooperation can result in additional types of interactions. For example, in some embodiments, it can result in the external computing device functioning as controls 240 and display 245, replacing the need for those functions in the AMESD and thereby reducing its cost and size. In other embodiments, the external computing device can duplicate some or all of the functions of the controls and display. This can allow remote control of the AMESD as well as local control. The external computing device and the processor can also cooperate to perform functions that are presently attributed to just the processor. This allows computation to be offloaded to hardware with more resources such as larger memory, faster processing, a global positioning system (GPS) receiver, and access to the internet.

External computing device 535 can be an application specific design. It can also be a commercially available product such as a laptop computer, tablet, smart phone, or cell phone. (This list is not intended to be complete or limiting, practitioners knowledgeable in the art will be able to apply the teachings of this Application to other embodiments). The functions of the external computing device can be implemented by an embedded processor executing a program (a sequence of programmed instructions) stored within the device, such as firmware. The functions can also be implemented by the execution of an app 540. The app (short for application) is a program or set of programs that can be loaded onto the device as an integral unit and is designed to perform a group of coordinated functions or tasks. The app can be downloaded into the external computing device over the internet, providing the device has an internet connection, such as through a cellular link (not shown) or through wireless network 255 to an internet gateway device (not shown).

Applicants recognize that with the on-going reduction in prices of solar (photovoltaic) panels, their use has become more practical and common. Solar panels provide another viable alternative for power in off-grid situations. However, a well-known limitation of solar panels is that the power produced varies throughout the day with the position of the sun, and varies less deterministically with weather determined sky conditions. Attaching an AMESD to a solar power source allows the energy storage to 'level out' these variations and provide a more reliable and predictable source of power. In addition, the compact size and relative light weight of solar panels render them reasonably portable making them appropriate for more mobile applications where they can be used to recharge the AMESD. In these applications, time-until-discharged and the time-untilcharged are again of interest to the user. However, as should be readily apparent to one of ordinary skill in the art, the additional variability from a solar power source increases the difficulty in such determinations.

Figure 6:
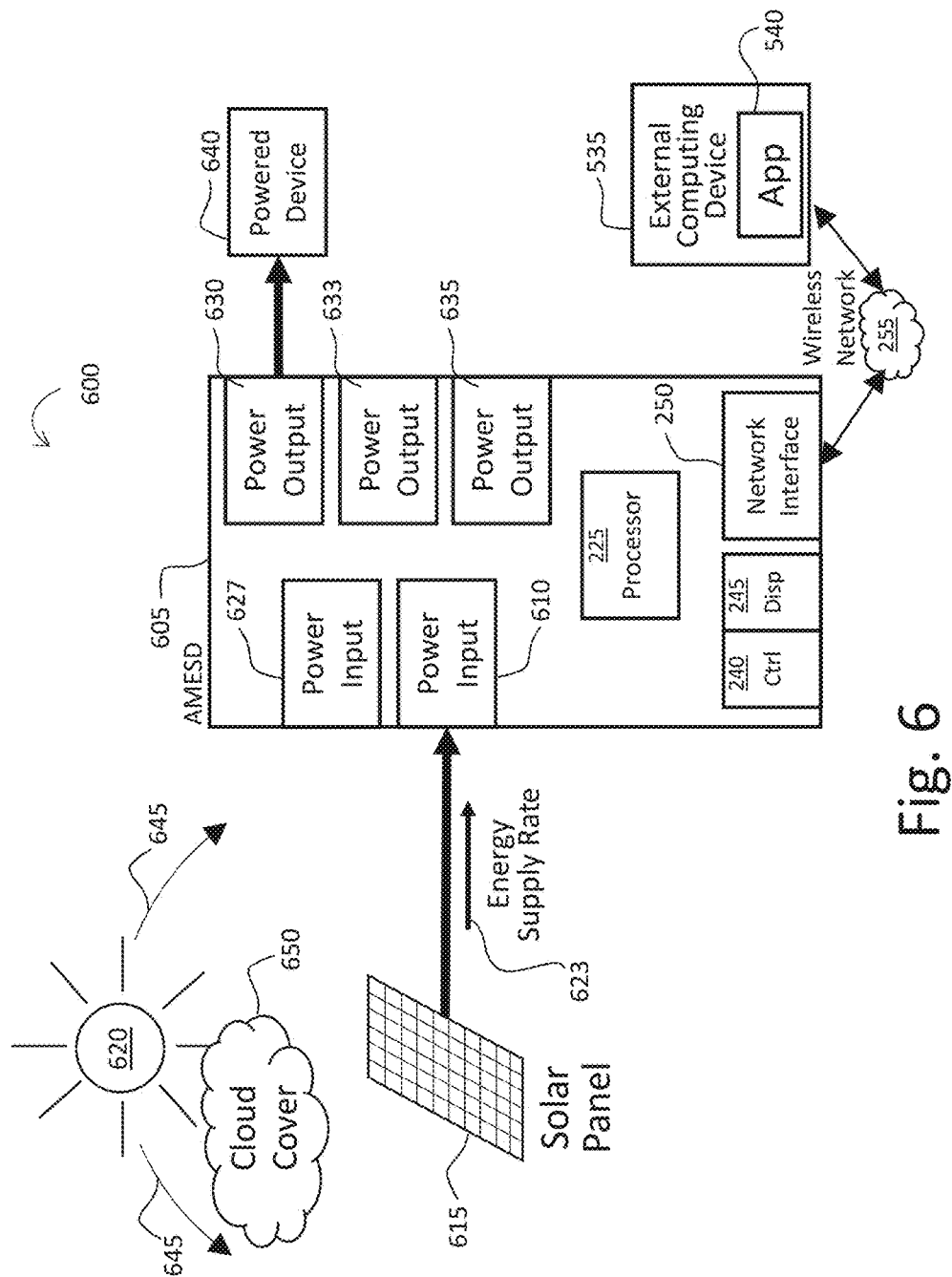
FIG. 6 is a block diagram of a mobile energy storage system incorporating an embodiment of an AMESD that is using an environmental power source to harness energy from the environment in accordance with the present disclosure.

Focusing attention now on FIG. 6, a block diagram for another embodiment of a mobile energy storage system 600 is presented that includes an AMESD 605. Similar to AMESD 500 in FIGS. 5A, 5B, and 5C, AMESD 605 is another embodiment, in accordance with the present disclosure, of the AMESD that was discussed earlier with respect to FIG. 2. (The embodiment of the AMESD in FIG. 2 is indicated by the reference number 200). In these diagrams, AMESD 605 can include the structure of previously described AMESD 200 of FIG. 2. Accordingly, the present descriptions will be limited to describing differences and the figure is likewise limited to illustrating those differences with components that are not explicitly shown in FIG. 6 being understood to be present for purposes of brevity.

Mobile energy storage system 600 can use energy from the environment to 'charge' (i.e., supply electrical energy to) AMESD 605. In the embodiment depicted, the chosen environmental energy is solar and such an arrangement can also be used to perform the 'leveling out' referred to above. A power input 610 of AMESD 605 can be connected to an environmental power source 615. The environmental power source can receive energy from an environmental energy source 620, which the power source can convert into electrical energy that can be supplied to the power input. In this embodiment, the environmental energy source is the sun which supplies solar energy to a solar panel that comprises the environmental power source. For the sake of clarity, environmental power source 615 can also be referred to as solar panel 615 or simply as the solar panel. Likewise, environmental energy source 620 can also be referred to as sun 620 or simply as the sun. In other embodiments, the environmental power source can use some other solar to electrical energy technology. In still other embodiments, a different environmental energy source 620, in conjunction with an appropriate environmental power source 615, can be used. In one example embodiment, the environmental energy source can be the wind and the environmental power source can be a wind driven turbine powering an electrical generator. Other examples can include water turbines that generate power from moving water (e.g. creek or stream) or a thermoelectric generator that can generate electrical energy from a temperature difference, such as between a campfire and the air. It should be noted that a mobile energy storage system, with an appropriately configured AMESD, can be connected to and receive electrical energy simultaneously from combinations of multiple power sources and/or environmental power sources.

Solar panel 615 receives solar energy from sun 620, which the panel converts to electrical energy that is supplied to AMESD 605 through power input 610. The rate at which the electrical energy is supplied from the solar panel to the AMESD can be characterized by an energy supply rate 623. Applicants observe that, unlike many sources of electrical energy which have low output impedance, the voltage produced by an environmental power source can have significant impedance; the voltage produced can vary significantly with the amount of current being supplied. Environmental power sources 620 usually exhibit a single operating point of voltage and current that maximizes the electrical energy supplied. The maximum energy operating point can be very sensitive to changes in the operating parameters of the environmental power source, such as temperature and energy input level, that can make the conversion efficiency of simple, static designs for power input circuits inefficient. Solar panels usually exhibit this high output impedance effect. Practitioners with experience in interfacing with solar panels will be aware of a technique referred to as Maximum Power Point Tracking or MPPT. This technique constantly makes slight adjustments to the current drawn from the solar panel, monitoring the voltage produced, and keeps the operating point correct to maximize the energy supply rate (the flow rate of energy produced). For a power input of a type configured to connect to an environmental power source, such as power input 610, AMSED 605 can implement MPPT for the electrical energy it receives. MPPT can be implemented in the circuitry of power input 610 and the input power converter to which the power input attaches. (The input power converter is not shown in this diagram. Its functions are discussed earlier in the section regarding FIG. 2 where the input power converter is identified by reference number 230). MPPT can also be implemented in a combination of software executing on processor 225 as well as in the circuitry of power input 610 and its associated input power converter.

The AMESD can have one or more additional power inputs, such as power input 627. In this embodiment, power input 627 is configured to receive 120 volts ac, but can be configured differently in other embodiments. Power input 627 can be connected to an electrical outlet power source and electrical energy can be transferred into the AMESD through power input 627. This can occur at the same time electrical energy is transferring into the AMESD from solar panel 615 through power input 610. However, in the embodiment depicted, power input 627 is not connected, no electrical energy can transfer through it, and no other power source is shown.

AMESD 605 can also have one or more power outputs. In the embodiment depicted in FIG. 6, there are three power outputs 630, 633, and 635, but only power output 630 is shown connected. Power output 630 can be a conventional electrical outlet that supplies the 120 volts ac produced by an inverter. The types of power outputs 633 and 635 are not specified. Power output 630 can be connected and transfer electrical energy to a powered device 640, which can be a device compatible with power output 630 (plugs into a 120V ac outlet). In some instances, multiple power outputs can be connected to powered devices with combinations of power outputs enabled and transferring electrical energy. In still other instances, there can be no power outputs that are enabled or connected: resulting in no electrical energy transferring out of the AMESD. In this last example, the incoming solar derived electrical energy will be used only to charge the AMESD. (The term charge is used to describe electrical energy transferring into an AMESD for storage in the energy storage component 205 (FIG. 2) of the AMESD).

Environmental factors can control both the amount of and the rate at which incoming energy from an environmental energy source is received by an environmental power source. Referring again to FIG. 6, an environmental factor 645 can be the position in the sky of sun 620. The sun's position can affect the angle at which the solar radiation strikes solar panel 615, which in turn can control the amount of and rate at which solar energy is collected. Environmental power sources, such as the solar panel, supply electrical energy converted from the energy received, making the rate at which that electrical energy is supplied responsive to the environmental factor. Focusing on solar panel 615, energy supply rate 623 from the solar panel is responsive to environmental factor 645, the sun's position. This response can be modelled using the sine of the elevation angle of the sun. (The elevation angle is approximately 0° when the sun is on the eastern horizon, 90° when the sun is at its zenith, and 180° when the sun is on the western horizon). The resulting response function is then:

$$f = \sin(\text{elevation}) \quad [\text{EQN 3}]$$

$$P_{supply} = P_{nom} \cdot f = P_{nom} \cdot \sin(\text{elevation}) \quad [\text{EQN 4}]$$

where:
f=Environmental Factor
$P_{supply}$=Energy Supply Rate from Environmental Power Source
$P_{nom}$=Nominal Energy Supply Rate (when sun at its zenith)

Environmental factor 645 (the sun's position) can be predicted in advance for a given time of day. A variable h can be assigned to represent a given time of day in decimal hours. Using this representation, 7:30 am will correspond to h=7.5 and 3:15 pm will correspond to 15.25. A variable $h_{sunrise}$ can be assigned a value corresponding to the hour of sunrise, at which time the elevation angle of sun 620 is 0°. Likewise, a variable $h_{sunset}$ can be assigned a value corresponding to the hour of sunset, at which time the elevation angle of the sun is 180°. The time of the sun's zenith can be approximated as half way between $h_{sunrise}$ and $h_{sunset}$. This results in the following equation for predicting the elevation of the sun at a specified time of day. (The time of day is measured in decimal hours and is represented by the variable h):

$$sunhours = h_{sunset} - h_{sunrise} \quad [\text{EQN 5}]$$

$$\text{elevation}_{predicted}(h) = \frac{h - h_{sunrise}}{sunhours} \cdot 180° \quad [\text{EQN 6}]$$

The result of EQN 5 and EQN 6 for the predicted elevation can be substituted into EQN 3 and a predicted value for the environmental factor f at time h can be obtained. This value, in turn, can be substituted into the first half of EQN 4 to obtain the predicted value for $P_{supply}$ at time h, where $P_{supply}$ represents energy supply rate 623, the rate which electrical energy will be supplied from the solar panel to AMESD 605:

$$f(h) = \sin\left(\frac{h - h_{sunrise}}{h_{sunset} - h_{sunrise}} \cdot 180°\right) \quad [\text{EQN 7}]$$

$$P_{supply}(h) = P_{nom} \cdot f(h)$$

$$P_{supply}(h) = P_{nom} \cdot \sin\left(\frac{h - h_{sunrise}}{h_{sunset} - h_{sunrise}} \cdot 180°\right) \quad [\text{EQN 8}]$$

Processor 225 of AMESD 605 can utilize a look-up table or other suitable mapping technique to determine $h_{sunrise}$ and $h_{sunset}$ from the day of the year. The lookup table can be stored within the AMESD. The table can be loaded into the AMESD from another source, such as from a device connected via wireless network 255 or from the internet. With the accompanying loss of efficiency and energy harvested, the model can be simplified by assuming that sunrise and sunset times are always at 6:00 am and 6:00 pm. The constant $P_{nom}$ of EQN 6, the nominal value for $P_{supply}$ (the energy supply rate 623), represents the value of $P_{supply}$ before it is reduced by environmental factor f (the sun's position 645), which is the value of $P_{supply}$ when the sun is at its zenith. In most instances, this will not be known ahead of time, i.e., the AMESD will be operating at a time before or after noon and there will have been no opportunity to measure $P_{supply}$ at the sun's zenith. However, $P_{nom}$ can be deduced. It can be estimated by using $P_{curr}$, the measured value for energy supply rate 623 at $h_{curr}$ (the current time in decimal hours). These quantities can be used with EQN 4 and EQN 6 to back-solve for what $P_{nom}$ should be, given that $P_{curr}$ was measured:

$$\text{elevation}_{curr}(h_{curr}) = \frac{h_{curr} - h_{sunrise}}{sunhours} \cdot 180° \quad [\text{EQN 9}]$$

$$P_{curr} = P_{nom} \cdot f(h_{curr}) = P_{nom} \cdot \sin(\text{elevation}_{curr}) \quad [\text{EQN 10}]$$

$$P_{nom} = \frac{P_{curr}}{\sin(\text{elevation}_{curr})} \quad [\text{EQN 11}]$$

The estimate of $P_{nom}$ can be improved as time elapses. The value of $P_{curr}$ can be measured at multiple points in time corresponding to multiple values of elevation. A regression technique can be used to find the best value for $P_{nom}$ to fit EQN 10 to the measurements. AMESD 605 can use a RTC, or Real Time Clock, (not shown) to keep track of the current time. The RTC can also be used to keep track of the current day of the year (which can then be used to lookup $h_{sunrise}$ and $h_{sunset}$).

In the earlier discussion regarding FIGS. 2 and 3, estimate of time 365 until state of charge 215 reaches a particular level was discussed. (The state of charge is a characteristic of energy storage component 205 of AMESD 200). The possible usefulness of these estimates to a user of the AMESD was discussed, particularly regarding the estimates of time $t_{full}$ and $t_{empty}$. In that embodiment, the estimate of time was based on the assumption that energy storage rate 217 will continue at its present value. From the discussion regarding FIG. 2: the energy storage rate is the sum of the positive energy flow rates from the energized input power converters 230 and the negative energy flow rates into the energized output power converters 224 and 224', neglecting any losses. In mobile energy storage system 600, the electrical energy flow rate from the environmental power source, energy supply rate 623, can comprise one of these positive energy flow rates and thus affects the value of energy storage rate 217 (FIG. 2). Estimate of time 365 (FIG. 3) can be improved from the previous assumption of an unchanging energy storage rate 217 by using predicted future values for the energy storage rate. In the embodiment being discussed, energy storage rate 217 can be predicted by using predicted future values of energy supply rate 623. The energy storage rate now becomes a changing function of time rather than a constant. Estimating a future value for state of charge 215 (FIG. 2) at a time in the future $t_f$ can be determined by integration of the predicted energy supply rate:

$$SOC(t_f) = SOC_0 + \frac{1}{C} \int_{t_0}^{t_f} r_{storage}(t) dt \quad [\text{EQN 12}]$$

where:
$SOC_0$=initial value for State of Charge at time $t_0$
$SOC(t_f)$=predicted State of Charge at time $t_f$
C=Capacity of Energy Storage Component
$t_f$=time in the future of prediction
$t_0$=current time
$r_{storage}(t)$=predicted Energy Storage Rate at time t
t=time (over which to integrate from $t_0$ from $t_f$)

Processor 225 can determine estimate of time 365 (FIG. 3) until state of charge 215 (FIG. 2) reaches a particular level by evaluating EQN 12 above. This can be done with well-known techniques of numerical integration. At each iterative time step, the estimated future value for the state of charge can be determined and then compared to the particular level. When the state of charge reaches the particular level, the current value of the integrating time variable can be used for the estimate of time.

Returning again to FIG. 6, the block diagram depicts an additional environmental factor 650 affecting energy supply rate 623 from solar panel 615. Environmental factor 650 can be a component of the weather, such as cloud cover, that can affect the amount of solar radiation from sun 620 that is received by the solar panel 615. This is similar to the circumstances that were discussed earlier regarding environmental factor 645 (position of the sun in the sky); by controlling the amount of solar energy available to the solar panel, the energy supply rate is responsive to environmental factor 650 (cloud cover). In an embodiment, the response function for environmental factor 650 can be modelled as linear, that is:

$$f = P_{nom}(1-CC) \quad [\text{EQN 13}]$$

$$P_{supply} = P_{nom} \cdot f = P_{nom} \cdot (1-CC) \quad [\text{EQN 14}]$$

where:
f=Environmental Factor
$P_{nom}$=Nominal Energy Supply Rate
CC=Cloud Cover (0=clear sky, 1=completely cloudy)
$P_{supply}$=Energy Supply Rate from Environmental Power Source In other embodiments, any suitable type of modelling, either currently available or yet to be developed, can be used.

Estimate of time 365 (FIG. 3) can be affected by environmental factor 650, the cloud cover CC, in the same way it is affected by environmental factor 645, the sun's position. Energy supply rate 623, $P_{supply}$ in EQN 14 above, is determined by the cloud cover. Following the reasoning outlined above, the energy supply rate contributes to the determination of energy storage rate 217 (FIG. 2). EQU 12 can then be used to estimate a future value for state of charge 215 (FIG. 2) by integrating the energy supply rate, the function $r_{storage}(t)$ in the equation. Processor 225 can perform numerical integration and the state of charge evaluated at each time step. The estimate of time is determined when the state of charge reaches the particular level.

A practitioner of ordinary skill in the art will recognize that the accuracy of determining estimate of time 365 (FIG. 3) in the above discussion can be improved by the use of more complicated models. For example, in EQN 3 of the present embodiment, the response function to environmental factor 645, the sun's position, is based on the model that solar energy collected is in proportion to the cosine of the angle of incidence at which the solar radiation strikes solar panel 615. (The angle of incidence is modelled as the complement of the elevation angle. Taking the cosine of the elevation subtracted from 90° results in the sine function observed in EQN 3). For some solar panel technologies, a different model can provide more accurate results for the response of the electrical energy produced to the angle of incidence of the incoming solar energy. A different embodiment can incorporate such models, which can use higher order equations and more complicated algorithms. As another example, the model used to predict the relative position of the sun that resulted in EQN 6 can also be still further improved. An improved model is discussed later regarding FIG. 8, which can be incorporated into a different embodiment.

Figure 7:
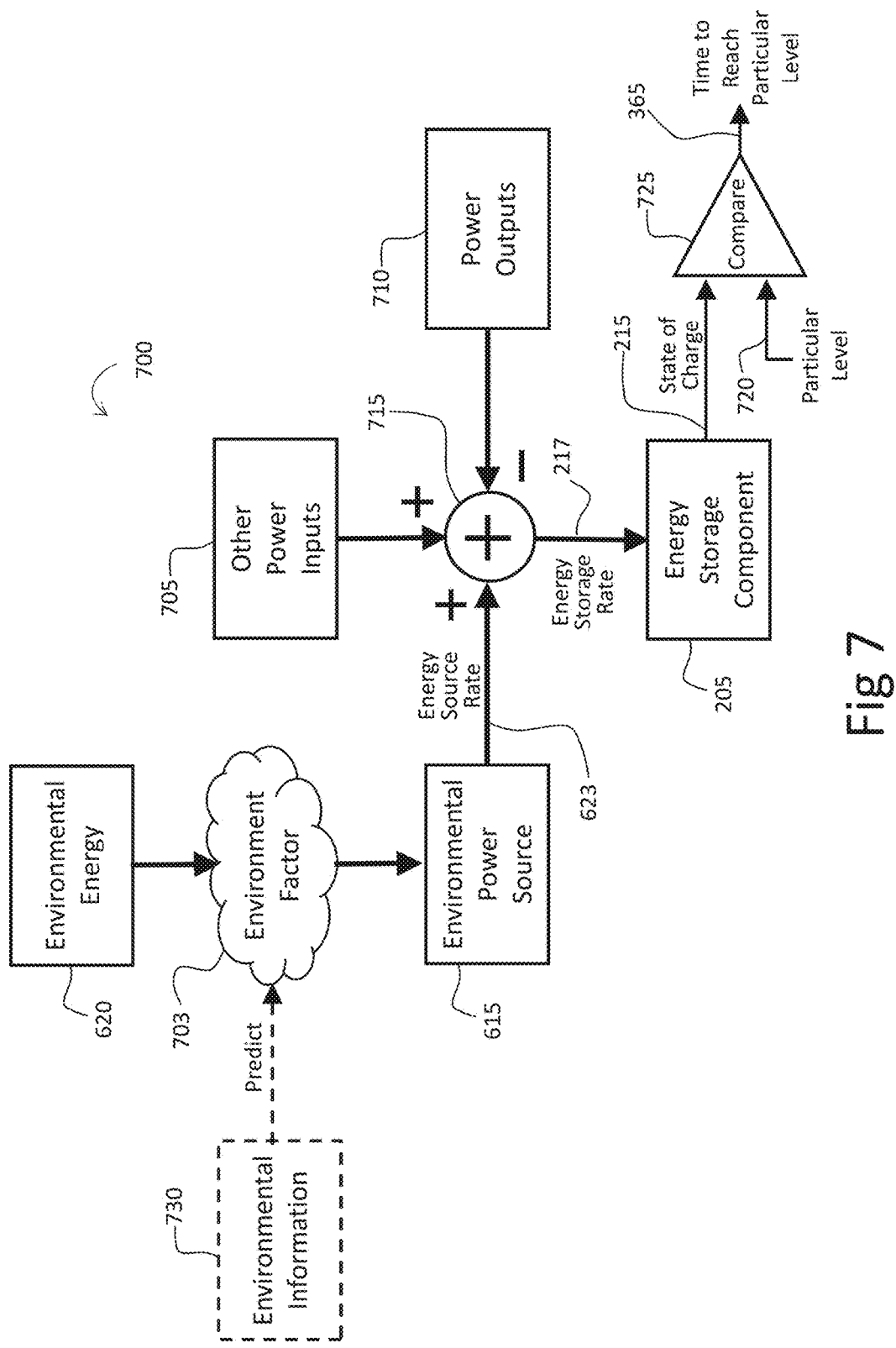
FIG. 7 is a diagrammatic illustration of the determination of an estimate of time until the state of charge of an AMESD reaches a particular level in accordance with the present disclosure.

FIG. 7 is a diagram, generally indicated by reference number 700, that illustrates how the various quantities and values of the previous discussion interact and function together to determine estimate of time 365. Environmental power source 615 receives energy from environmental energy source 620. In the embodiment discussed above, the environmental energy source is the sun providing solar energy. As previously discussed, there can be other environmental energy sources 620 such as wind, hydro, and thermal. The energy from the environmental energy source can be controlled by an environmental factor 703, such as the sun's position 645 (FIG. 6) and cloud cover 650 (FIG. 6). In some embodiments, there can be multiple environmental factors 703 operating at the same time on the same environmental energy source 620. There can also be multiple environmental energy sources 620 being harvested at the same time. Environmental energy can be converted into electrical energy by environmental power source 615. The electrical energy is supplied at energy source rate 623 into AMESD 605. (The AMESD is not shown in this diagram and was discussed earlier regarding FIG. 6). Inside the AMESD, the electrical energy is processed by input energy converter 230 (FIG. 2) to a voltage compatible with energy storage component 205. Electrical energy can also enter the AMESD through a sum of other power inputs 705, such as power input 627 (FIG. 6). Electrical energy can leave the AMESD through a sum of power outputs 710, such as power output 630, 633, and 635 (FIG. 6). Energy source rate 623, the energy flow rate from the sum of other power inputs 705, and the energy flow rate into the sum of other power outputs 710 (negative because the energy is leaving) are combined 715 to determine energy storage rate 217, the flow rate of energy into energy storage component 205. The integration over time of the energy storage rate determines state of charge 215 for the energy storage component per EQN 12. Estimate of time 365 is determined by the prediction of when the state of charge reaches a particular level 720. Processor 225 can determine the estimate of time by numerically integrating the energy storage rate $r_{storage}(t)$ in EQN 12 and comparing 725 the state of charge to the particular level at each iterative time step.

Environmental factors 703 can be a result of a stochastic process. That is, the value of an environmental factor at some future time can be probabilistic and can have a statistical distribution. The statistical distribution can be characterized by an expected value and a standard deviation. In some embodiments, statistical techniques that account for and use entire statistical distributions can be used to calculate the estimate of time 365 until particular level 720 is reached by state of charge 215. In the present embodiment, independent Gaussian statistical distributions are assumed and the expected value of the distribution can be used as an estimate.

Information used to predict the values of environmental factors 703 at a future time can be referred to as environmental information 730. The latter can contain information about the statistical distribution of future values for the environmental factors for a range of future times. For example, in FIG. 6, weather forecast environmental information 655 can list, for each hour interval over the next 24 hours, the expected value of cloud cover environmental factor 650. Different embodiments can communicate the environmental information in other formats. For example, the interval size and number of intervals can be different. In other embodiments, a piece-wise-linear or analytic function for the expected future value of a cloud cover environmental factor can be used.

A practitioner of the art will quickly realize that the preceding discussion regarding environmental factor 650 applies to environmental energy sources 620 other than solar. For example, in an embodiment harnessing wind power, where environment energy source 620 is the wind and environmental power source 615 is a wind turbine powered electric generator, the amount of energy available can be dependent on the wind speed, which can function as environmental factor 703. The wind speed can be predicted and environmental information 730, such as a weather prediction, can be used to provide statistical distribution of future values for the environmental factor (the wind speed).

As previously discussed, the power produced by solar panels is a strong function of the sun's relative position. In this same way, the orientation of the panels can strongly affect the amount of power produced, making correct orientation of the panels important. Applicants note that in mobile applications, where the panels can be repeatedly set up and taken down, properly adjusting the orientation of the panels can become a burden to the user. Accordingly, the AMESD of the present disclosure can assist the user in properly orienting a solar panel.

Figure 8:
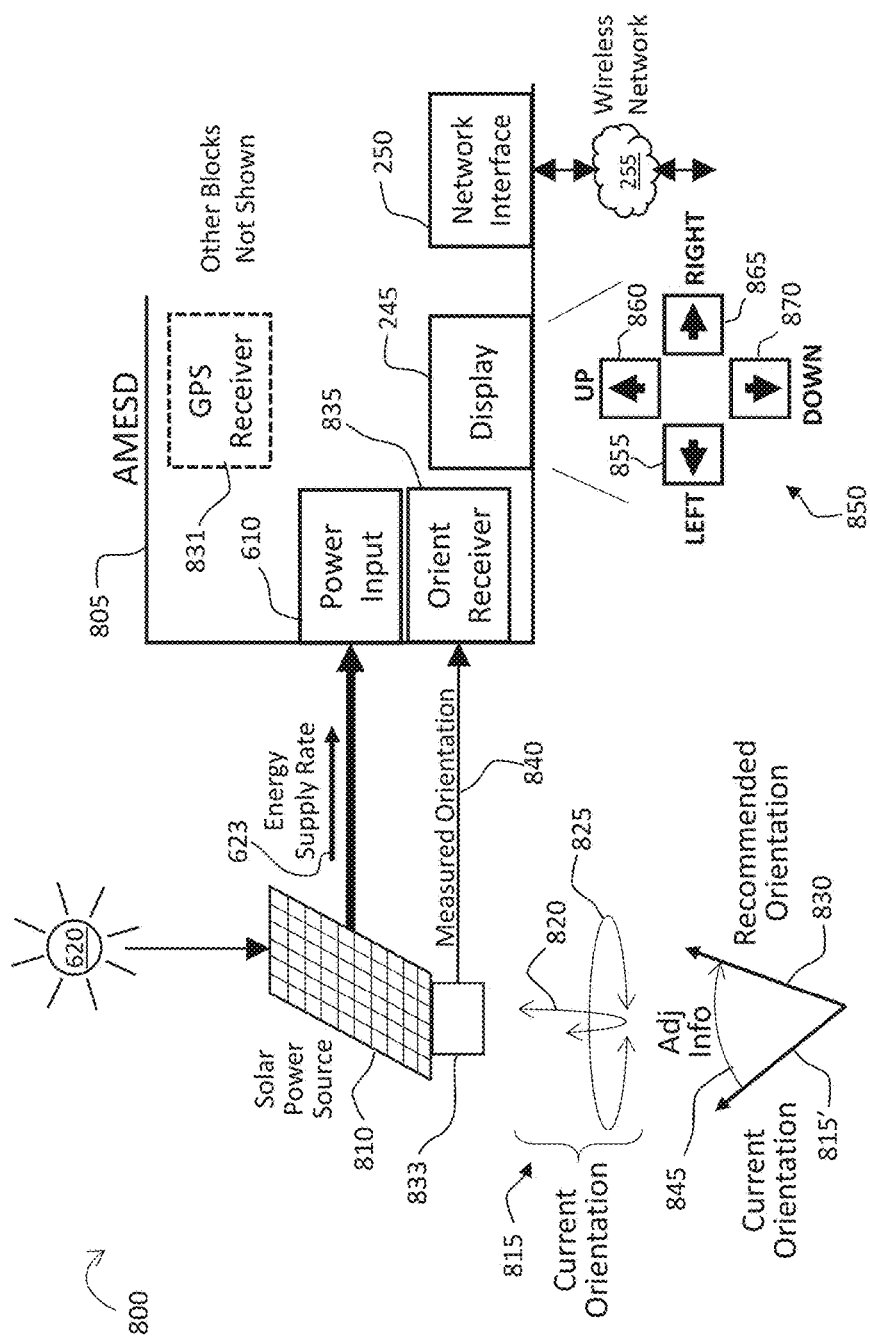
FIG. 8 is a block diagram of a mobile energy storage system with additional details at least showing the adjustment of the orientation of a solar power source used to supply electrical energy to an AMESD in accordance with the present disclosure.

The reader's attention is now directed to FIG. 8, which is a block diagram of a mobile energy storage system, generally indicated by reference number 800, that includes another embodiment of an AMESD 805, in accordance with the present disclosure, configured to assist a user with properly aligning a solar power source 810. In the diagram, AMESD 805 can include the structure of previously described AMESD 200 of FIG. 2. Accordingly, the present descriptions will be limited to describing differences and the figure is likewise limited to illustrating those differences with components that are not explicitly shown in FIG. 8 being understood to be present for purposes of brevity. Some of the additional blocks that are not shown and can comprise the AMESD are power inputs 227, power outputs 220 and 220', energy storage component 205, and processor 225. (These additional blocks are discussed in the section regarding FIG. 2). AMESD 805 can receive electrical energy from solar power source 810 through power input 610. The flow of electrical energy from the solar power source to the AMESD can be characterized by an energy supply rate 623.

In the present embodiment, solar power source 810 can be environmental power source 615 configured to receive solar energy from sun 620 as discussed previously regarding FIG. 6. A practitioner of the art will realize that there are many ways in which mobile energy storage system 800 can comprise solar power source 810. In one example embodiment, the solar power source can be a separate device attached to the AMESD by an electric cable. In another example embodiment, the solar power source can be an integral component of AMESD 805, such as integrated into the top of the AMESD.

Solar power source 810 can be characterized by a current orientation 815, the direction pointed by the light-entering axis of the solar power source. When the solar power source comprises a planar solar panel, the current orientation (light-entering axis) is parallel to the normal to the plane of the solar panel. The current orientation can be represented in different ways. One way is to use measures on axes that conveniently represent the way in which the current orientation of the solar power source changes. These axes can, but do not necessarily, correspond to the actual way in which the solar power source mechanisms allow the current orientation to be adjusted. In embodiment 800, the solar power source is configured such that the current orientation is a direction in three dimensions represented by an elevation 820 and an azimuth 825. An angle of elevation measurement was discussed earlier regarding the sky position of the sun in the discussion about FIG. 2. Elevation 820 is the angle formed between the current orientation and its projection into the horizontal plane of the surface. The angle can vary from 0° when the solar power source points toward one horizon, through 90° when it points straight up perpendicular to the surface, to 180° when it points toward the opposite horizon. Azimuth 825 is the angle of rotation, about an axis perpendicular to the surface, of the projection of the current orientation into that surface. In other words, the azimuth can be thought of as the angle of rotation of the solar panel about an axis perpendicular to the surface. The angle can vary from 0° when the solar power source points north, through 180° when it points south, to a limit of 360° when it approaches north again. The current orientation can also be thought of a vector, the depiction of which is identified in the diagram by the reference number 815'.

A practitioner knowledgeable in the art of solar energy will be aware that the amount of solar energy collectable from a solar panel can generally be maximized by orienting the panel so that it faces south at an elevation angle equal to the latitude subtracted from 90°. So, for a similarly optimized panel being installed in Boulder, Colo. (40° N, 105° W), it would be installed facing south with an elevation of 90°−40°=50°. This direction forms a recommended orientation 830. As depicted in FIG. 8, the current orientation of solar power source 810 significantly differs from the recommended orientation. Consider a given period of time, such as the coming year. With the panel of the solar power supply at current orientation 815, the sun 620 will sweep through the range of its predicted positions and a determination can be made as to the expected amount of energy that will be collected and converted to electricity. When the solar power source is adjusted to a second orientation, the same determination can be made. By using recommended orientation 830 as the second orientation, with other environmental factors being the same, a second amount of energy collected at the second orientation will be larger than the amount of energy that would otherwise be collected at the first orientation. Orientation 830 is recommended because it is known in the art of solar energy that for a fixed solar panel so oriented, considering only the sun's position environmental factor 645 (FIG. 6), the average amount of energy collected will be maximized. Applicants note that this does not necessarily mean that if other environmental factors are considered, such as cloud cover 650 (FIG. 6), the same recommended orientation 830 will result. This will be discussed in greater detail below.

AMESD 805 can assist the user of the device in properly orienting solar power source 810. As discussed in the preceding paragraph, the recommended value for elevation 820 can be determined from the latitude for the present location of the solar power source. In embodiments with a global positioning system (GPS) receiver, processor 225 (FIG. 2) can use the GPS receiver to determine the latitude directly. The AMESD can incorporate an embedded GPS receiver 831 or, in other embodiments, a receiver can be located in a device connected to the AMESD through network adapter 250 and wireless network 255. One example of such a device can be an external computing device 535 (FIGS. 5A-5C). The recommended value for elevation 820 of the solar power source can be communicated to the user, such as through display 245. The other part of recommended orientation 830, azimuth 825, can also be communicated to the user in the same way. (In the present example, the recommended azimuth is south). The recommended orientation can also be determined without the use of a GPS receiver. In other embodiments, the location of the AMESD can be supplied by the user. A map can be presented to the user, such as on display 245, and the user allowed to identify the location on the map, such as by use of controls 240 (FIG. 2). In other embodiments, the controls can be combined with the display to allow identification by touchscreen. In yet other embodiments, the user can indicate the name of a nearby major city, such as by pick-list or typing. A lookup table can then be used to map the city name to a latitude. The display and location selection can be on the AMESD, on the external computing device, or on some combination of both. In still other embodiments, the name of the major city can be spoken by the user and the city identified by a commonly available speech recognition algorithm, such as by a speaker independent pretrained neural net. Performance of these algorithms, determinations, and location of map storage can be located on the AMESD, the external computing device, on the internet, or by some combination of the three. The functionality allocated to the external computing device can at least be partially located within app 540 (FIG. 5).

Recommended orientation 830 for solar power source 810 is currently chosen to maximize the amount of solar energy collected by solar power source 810 for a period of an entire year. For shorter periods of time, that recommendation can be improved. For example, if mobile energy storage system 800 is set up in the afternoon and will only operate until evening, it will miss collecting the morning's solar energy. In this scenario, a recommended orientation that favors the afternoon hours will gather more energy than an orientation optimized falsely assuming both morning and afternoon operation. An improved recommended orientation can be determined by predicting the amount of solar energy collectable over the range of predicted sun's position for the given time period that system 800 will be operated.

Equations and algorithms, of varying degrees of complexity and accuracy, and that will predict the relative position in the sky of the sun at a given time and location (latitude and longitude), are well known within the art of solar energy. Processor 225 of AMESD 805 can use one such equation or algorithm to predict the amount of solar energy collectable over the range of predicted sun's position for the given time period that system 800 will be operated. A candidate orientation for the solar power source can be chosen. (This will be discussed in more detail shortly). The rate at which solar energy will be collected at a given time can be modelled as proportional to the cosine of the angle between candidate orientation and the position of the sun at that time. (As discussed earlier regarding FIG. 6, more complex models than cosine can also be used). This rate can be integrated over the given time period using the predicted sun position to determine the amount of solar energy collected for that candidate orientation. The candidate orientation that collects the maximum amount, the recommended orientation, can be found in a variety of ways. One way, for example, can be to use a gradient ascent method. Other environmental factors 703 (FIG. 7) can be included to further improve the recommended orientation. This can be accomplished by amending the rate of solar energy collection in the integration to include the effect of the other factors. Environmental information 730 (FIG. 7) can be used in the determination of environmental factor values as time changes through the integration of the solar energy rate.

Orienting solar power source 810 to recommended orientation 830 can be difficult for a user of mobile energy storage system 800. For example, when aligning the solar power source to a recommendation for elevation 820, the user may require a plumb bob and protractor. Some users may find it possible to set the elevation accurately enough by eye, without additional equipment. However, it can be very difficult for the user to align the solar power source to a recommendation for azimuth 825 without a compass. As will be described immediately hereinafter, Applicants have resolved this concern in what is believed to be a heretofore unseen manner.

Solar power source 810 can be attached to an orientation sensor 833, which can be used to assist the user of mobile energy storage system 800 to orient the solar power source to recommended orientation 830. The orientation sensor can measure some or all components of current orientation 815. For example, the orientation sensor can measure elevation 820 using a commercially available part, such as a tilt sensor or accelerometer. Azimuth 825 can also be measured using, for example, an electronic compass module. The measurements can be communicated to an orientation receiver 835 over a communication link 840. The communication link can communicate serial data over a separate set of wires connecting the solar power source to AMESD 805. In another embodiment, the communication link can 'piggyback' on the wires conducting the electrical energy from the solar power source to the AMESD, eliminating the need for an additional cable. Serial data communicating the measured orientation can be superimposed onto the electrical energy dc voltage using one of many communication protocols that are well-known within the art, such as a FM modulated AC-coupled carrier. In another embodiment, the communication link can be a modulated radio link. In yet another embodiment, the orientation sensor can interface to wireless network 255 and communication link 840 can be through the wireless network. Processor 225 can obtain a measurement of current orientation 815 from orientation receiver 835.

Adjustment information 845 can be determined by processor 225 from the measurement of current orientation 815 and recommended orientation 830. The adjustment information can be communicated to the user via display 245. In an embodiment in which external computing device 535 (FIGS. 5A-5C) is connected through wireless network 255, the display on the external computing device can be used, or both simultaneously. The adjustment information can be a numerical or graphical representation, and can also be a combination of both. In one example embodiment, the component values of the recommended orientation and the current orientation can be displayed numerically, which can allow the user to adjust the orientation of solar power source 810 until the current orientation is acceptably close to the recommended orientation. In another example embodiment, a graphic of a meter face can be displayed. A graphic depiction of two needles can be superimposed upon the meter face: one indicating the current orientation and the other indicating the recommended orientation. Processor 225 can also compare the measurement of current orientation 815 to the recommended orientation 830 and determine adjustment information 845 that is relative to the current orientation. This advantageously reduces or eliminates the need for the user to make comparisons while adjusting the orientation. Relative adjustment information 845 can be determined by calculating the vector (component based) difference between the recommended orientation and the current orientation. Adjustment information 845 that is relative can be displayed in a manner similar to one of those described above.

Adjustment information 845 can also be displayed in a manner such that the user can easily discern the next adjustment to make in aligning the orientation of the solar power source 810. For example, a group of indicators 850 (located in FIG. 8 near display 245) can readily communicate the next adjustment to make. In the embodiment depicted, four square-shaped indicators comprise the group 850, each representing a direction that can be adjusted. The indicators are individually identified by reference number 855, 860, 865, and 870 and each identified by the text "LEFT", "UP", "RIGHT", "DOWN" respectively. Each indicator is labeled in its center with an arrow pointing in a direction corresponding to the text label. In other embodiments, the number of indicators comprising the group and their arrangement can be different, as can their attributes such as shape, directions, labels, markings, and so on. The directions indicated need not be orthogonal nor Euclidian: a rotation can be indicated. When indicating an adjustment to the user, an indicator can light up, un-blank, change color, change shape, animate, and so on. In addition, group 850 can be altered to aid in the indication, including, without limitation, rearranging, animating the arrangement of, and changing the number of the indicators displayed. In the embodiment depicted, group of indicators 850 is shown as an image on display 245. In other embodiments, a display on a device connected via wireless network 255, such as external computing device 535 (FIGS. 5A-5C), can be used. In some embodiments, the indicators can be illuminated, such as by LEDs. These can be positioned on the exterior of AMESD 805 or solar power source 810 so that the indicators are easily visible by the user. In some embodiments, the illuminated indicators can be located on or near the places of adjustment on the solar power source.

Applicants hereby describe a solar energy-storage cooler. Features of the heretofore described AMESD (Advanced Mobile Energy Storage Device) can advantageously be incorporated into a mobile housing that also functions as a mobile chest-type cooler that preserves the temperature of the contents in its interior. Like an AMESD, a mobile chest-type cooler can be used in off-grid situations where it can do such things as preserving food and medicines by keeping them cold. In recreational situations, frequently occurring where connection to the power grid is inconvenient, a mobile chest-type cooler can keep meals and snacks at palatable temperatures while an AMESD powers entertainment and recharges personal portable devices. Providing both the features of an AMESD and a mobile chest-type cooler in a single unit beneficially makes transportation easier, and can reduce cost, size, and weight. The coupling of a solar power source to an AMESD has been described in detail above, along with some of the advantages for doing so. A housing suitably sized to function as a mobile chest-type cooler can serve as a mounting for a solar panel. A solar energy-storage cooler comprises at least: an energy storage device configured to be mobile, such as the heretofore described AMESD, a housing that can additionally function as a mobile chest-type cooler, and a solar power source integrated into the housing. A solar energy-storage cooler, incorporating some or all of the advanced features, functions, and inventions described and taught throughout this Application, may hereinafter be referred to as a cooler.

The AMESD (Advanced Mobile Energy Storage Device) was previously discussed regarding FIG. 2 and referred to by the reference number 200. Applicants note that in those and subsequent discussions, a considerable array of advanced features and functions for an AMESD are described. Applicants further note that while these features and functions are advantageous and can be incorporated into an embodiment of a solar energy-storage cooler, the further teachings and inventions of the present Application can be applied to embodiments deploying only a subset of previously described capabilities of an AMESD. Similarly, some or all of these further teachings and inventions can be incorporated in a mobile energy storage device with a housing that can additionally function as a mobile chest-type cooler (but without the cost of the inclusion of a solar power source integrated into the housing). In other words, this disclosure also describes an energy-storage cooler: a solar energy-storage cooler without an integrated solar power source.

Applicants note that a hyphen is being used to connect 'energy' and 'storage' in the term 'solar energy-storage cooler'. This has been done to clarify and avoid confusion; without the hyphen, the terms 'solar' and 'energy' may be erroneously grouped together and may be incorrectly interpreted as a device that only stores 'solar energy' rather than electrical energy. To be consistent, the hyphen is also being used in the term 'energy-storage cooler'.

Figure 9A:
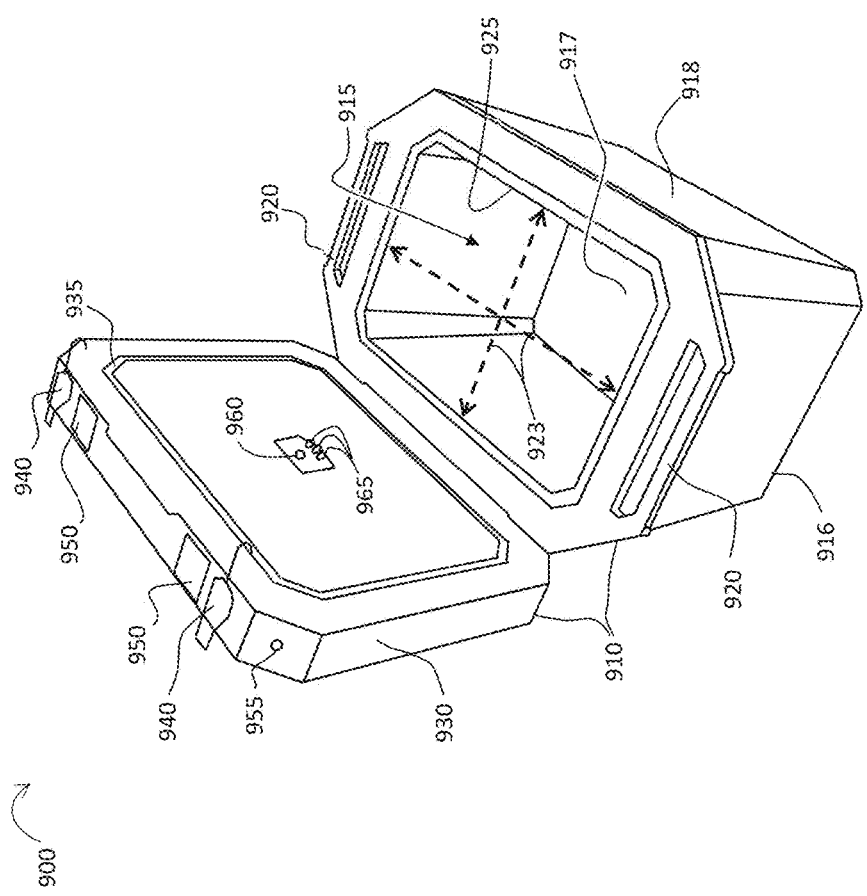
FIG. 9A is a perspective view of an embodiment of the front of a solar energy-storage cooler, depicted turned at a slight angle and with its lid in the open position, in accordance with the present disclosure.

Directing attention now to FIG. 9A, a perspective drawing of an embodiment of a cooler (solar energy-storage cooler) in accordance with the present disclosure is presented, generally indicated by the reference number 900, taken from above and to one side of the cooler. Cooler 900 includes a housing 910 that defines an interior 915. In the present embodiment, the interior is defined by a portion of the housing, a tub 916, that comprises a base 917 and four sidewalls 918 (only one of which is designated) coupled to the base. The housing is constructed in such a way that it is thermally insulating, i.e. heat does not flow easily or quickly through the housing walls. Housing 910 can be formed of a material that does not conduct heat well (i.e., has a high R value). The housing can be mobile, i.e., easily transportable. In the current embodiment, the housing includes handles 920 molded into a pair of opposing ones of the sidewalls to facilitate lifting and transporting. Other embodiments can have, as non-limiting examples, handles that are detachable or extendable, and/or wheels that are either an integral part of the housing or are detachable.

Figure 9B:
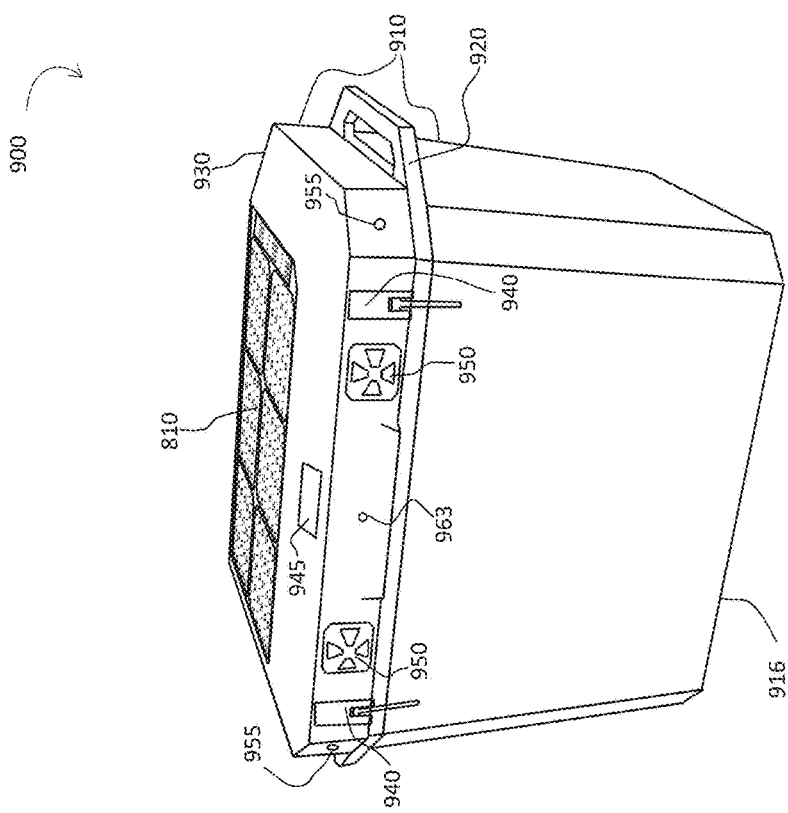
FIG. 9B is another perspective view of the embodiment of the solar energy-storage cooler of FIG. 9A, depicted a different angle and with the lid in a closed position, in accordance with the present disclosure.

Intersecting pair of dotted line segments 923 illustrate an opening 925 defined by housing 910. The opening allows access to interior 915. The figure illustrates another portion of housing 910 in the present embodiment, a lid 930. The lid is hingedly attached to a tub 916, as will be further described below. The figure depicts the lid in an open position that allows access to the interior via opening 925. With continuing attention directed on FIG. 9A, attention now should also be directed to FIG. 9B which is another perspective drawing of the embodiment of FIG. 9A, again generally indicated by the reference number 900. The view of FIG. 9B is taken from the front and to one side of the cooler. This figure depicts the lid in a closed position that seals opening 925: preventing access to and restricting air flow into and out of the interior.

As best seen in FIG. 9A, housing 910 can include a gasket 935 that improves the seal between lid 930 and tub 916 when the lid is in the closed position. The gasket can be formed of an easily compressible material such as, for example, rubber. One or more gaskets can be used. The housing can further include one or more latches 940 that, when engaged, hold the lid in the closed position. The current embodiment includes two latches.

Returning to FIG. 9B, a solar power source 810 (an embodiment of which is shown in FIG. 8) can be supported by housing 910 of cooler 900. One of ordinary skill in the art will understand that 'supported by' can refer to various methods such as, by way of example and not limitation, attaching the solar power source to the housing or integrally incorporating the solar power source into the housing. The solar power source can be attached such that it can unfold to facilitate absorbing solar energy and fold up to facilitate transportation. The solar power source can be detachable and can be connected by flexible wires to housing 910. The solar panel can be stowed within a cavity or pocket, connected by flexible wires, so that it is removable and can be positioned to face sunward. The portion of the housing supporting solar power source 810 can be lid 930 of cooler 900, tub 916 of cooler 900, or the solar power source can be supported by both. In the embodiment depicted in the figures, the solar power source is integrated into the lid.

Recalling the discussions regarding FIG. 2, controls 240 and display 245 can allow the user to communicate with processor 225 to control, configure, and monitor status of an AMESD (reference number 200 in FIG. 2). In cooler 900, corresponding controls 240 and display 245 can be mounted in a suitable and accessible location on housing 910. The present embodiment uses a touchscreen 945 to fulfill both the controls 240 and display 245 functions. The touchscreen is supported on the top of lid 930, near the front side where the lid of the cooler opens, in a location within easy reach of the user. Usage of touchscreen 945 will be discussed in greater detail below.

Housing 910 can also support one or more speakers 950. In the embodiment depicted, there are two speakers, both supported by (integrally integrated into) lid 930 of cooler 900. As previously discussed with regard to the solar power source, the speakers can also be supported by tub 916 or by some combination of both the lid and the tub. The speakers can be used to supply audio content such as from an audio module (not shown). The audio module can be supported by housing 910 of Cooler 900. In the present embodiment, the two speakers supply stereo audio content, such as music, from a stereo amplifier (audio module) incorporated into lid 930. Housing 910 can further support one or more exterior lights 955. These exterior lights can be LEDs and can be used to illuminate the area surrounding the cooler. The cooler embodiment depicted in the figure includes four exterior lights 955, one on each corner of the lid.

Again referencing FIG. 9A, housing 910 can also support one or more temperature sensors. These sensors can include, by way of non-limiting example, temperature sensitive electrical components such as thermistors and thermocouples. One of ordinary skill in the art will readily be aware of the various technologies and components available, and the trade-offs between them, and enabled with the present disclosure in hand, to select an appropriate solution for the requirements of the particular application under consideration. One or more interior temperature sensors 960 can be used to sense the temperature of air in interior 915 of housing 910. In the embodiment depicted in the figures, a single interior temperature sensor 960 is incorporated into (supported by) the underside of lid 930. To improve the accuracy of interior temperature sensor 960, the sensor can be in good thermal contact with the air of the interior, thermally insulated from the exterior of the housing, and thermally insulated from the housing itself. Interior temperature sensor 960 can also be installed in (supported by) tub 916. Temperature sensors can also be used to sense the air temperature of the outside air around the exterior of cooler 900. One such sensor is shown in FIG. 9B wherein an exterior temperature sensor 963 is depicted supported by lid 930. Other embodiments may locate sensor 963 elsewhere on housing 910 and/or may have additional external temperature sensors depending on the specific requirements and constraints. In addition to the exterior lights, solar energy-storage cooler 900 can include one or more interior lights 965. These interior lights can be supported by housing 910 of the Cooler and can illuminate interior 915 of the housing. In the present embodiment, interior lights 965 are comprised of three LEDs incorporated into the underside of lid 930. The LEDs comprising the interior lights can together be supported at an angle relative to the lid in a front-to-back direction such that, when the lid is in the open position, the light produced by the LEDs is directed toward approximately a center of the interior of the housing. In this way, the interior can be approximately uniformly illuminated in the front-to-back direction. Additionally, in the present embodiment, the three LEDs are also each appropriately angled within the plane defined by the rays of their light. In the view of FIG. 9A, the leftmost LED is directed toward the left, the right LED is directed toward the right of, and the center LED is appropriately directed toward approximately the center of the interior of the housing. In this way that the interior can be approximately uniformly illuminated in the left to right direction.

Figure 9C:
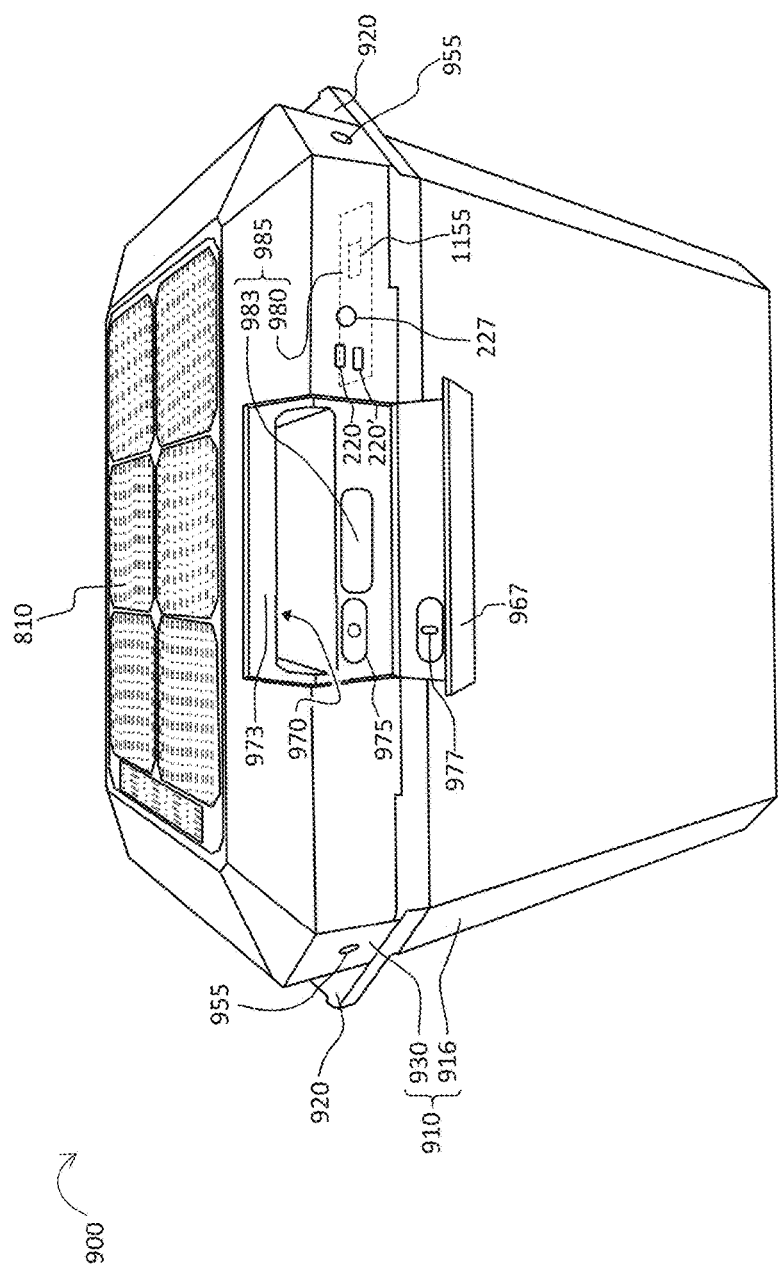
FIG. 9C is still another perspective view of the embodiment of the solar energy-storage cooler of FIGS. 9A and 9C, depicted with the lid in the closed position and illustrating a secure compartment and related details, in accordance with the present disclosure.

With continuing attention to FIGS. 9A and 9B, attention is now directed to FIG. 9C which is another perspective drawing of the same embodiment of a cooler, again generally indicated by the reference number 900. The view of FIG. 9C is taken from above the cooler and illustrates the rear side, the view of which is not visible in the previous two figures. The figure depicts lid 930 in the closed position. A compartment door 967 is illustrated in a first, open position, exposing and allowing access to a secure compartment 970. The secure compartment, which hereinafter can also be referred to as a compartment, can be integrally formed into housing 910, as a subassembly that is attached to housing 910, or some combination of both. In the present embodiment, the secure compartment is formed into lid 930. In other embodiments, the secure compartment can be formed into a different part of the housing, such as tub 916. The secure compartment can be separate and not accessible from the interior of the housing, providing a place for a user to secure valuable items such as, for example, a wallet, car keys, a cell phone, and the like. The compartment door can swing upward to selectively move between the first, open position (that is depicted in the figure) and a second, closed position. When in the second, closed position, the compartment door restricts unauthorized access to the secure compartment. In the embodiment depicted, compartment door 967 presses into a depression 973 in lid 930 so that the compartment door is at least approximately flush with the contoured surface or peripheral outline of the lid, obscuring the presence of secure compartment 970.

A lock mechanism 975 can lock compartment door 967 in the second, closed position. In the present embodiment, the lock mechanism can operate in response to electrical signals. A practitioner of ordinary skill will recognize that they are a myriad of ways to electrically control a lock. In some embodiments, two solenoids can be used: one to lock and another to unlock the lock mechanism. In the present embodiment, as the compartment door closes, a locking feature 977 on the door enters lock mechanism 975, having a complementary shape. When the compartment door moves into the second, locked position, the lock mechanism latches onto the locking feature. When activated by an electrical signal, a solenoid (internal and not shown) causes the lock mechanism to unlatch and release locking feature 977. While compartment door 967 closes, locking feature 977 compresses a spring (internal and not shown) in lock mechanism 975. When the lock mechanism releases the locking feature, the compressed spring pushes open the compartment door.

With continuing reference to FIGS. 9A, 9B, and 9C, the discussion of a solar energy-storage cooler, or cooler, has focused on the chest-type cooler attributes of its housing and improvements to the same. The discussion now turns to the energy storage device that further comprises cooler 900. The AMESD (Advanced Mobile Energy Storage Device), discussed in detail earlier in this disclosure, is well suited to this purpose. An AMESD, augmented with the circuitry need to control the additional functions in cooler 900 discussed above, will be referred to as a CCESS (Cooler Control and Energy Storage System). Applicants note that a CCESS can conveniently be divided into two subassemblies: the energy storage component (reference number 205 in FIG. 2) and the remaining electronic circuitry. The remaining electronics can conveniently be integrated together on a PCB (Printed Circuit Board), hereinafter referred to as a control board. A number of considerations concerning where to locate these subassemblies will now be discussed.

Applicants submit that users will most frequently use cooler 900 from the front side, the side of the cooler opposite from the lid hinge and that provides the easiest access to interior 915 through opening 925. This implies that controls 240 and display 245 (both FIG. 2) be located proximate to or on the front side, facing forward toward the user (and away from the cooler), for easy operation of the AMESD functions. Convenient access to the power connections, power inputs 227 and power outputs 220 (both FIG. 2), can be accomplished when they are positioned on the front side as well. The controls, display, and power connections require a short wiring distance to the control board, or a direct mounting to it, to maximize reliability and minimize cost and complexity. The same principles apply to other functions not directly associated with the AMESD, such as the audio speakers, temperature sensors, and lighting. Applicants submit that this tends to imply the control board can best be located on the front side of the cooler as well, supported by the front sidewall (the specific one of sidewalls 918 (FIG. 9A) that makes up the front side of the cooler).

There is still the question of how to support the control board on the front sidewall. An efficient way can be to mount the board parallel to the sidewall: either on an exterior surface, an interior surface, or inside. Mounting to a surface, interior or exterior, requires either a cover or a separate housing for the control board. This adds cost and can be difficult to seal against the wet and sometime salty environments to which a cooler is commonly subjected (e.g. beaches). Moreover, an additional cover or housing uses up space, can be in the way, and can be unattractive. In contrast, mounting the control board inside a sidewall avoids these issues. Combining this reasoning with that of the previous paragraph leads to the conclusion that the sidewall, inside of which to support the control board, should be the front sidewall.

Applicants also observe that the usual choice for an AMESD energy storage component is a rechargeable battery; they are practical, reliable, and cost effective. Earlier discussions regarding the AMESD taught that while there are many choices for battery technologies (chemistries), the common ones tend to be AGM lead-acid, gel-cell, and Ni-metal hydride. (Li-ion battery technologies are starting to become common in energy storage devices). These common battery types can be heavy and bulky, especially when they store larger amounts of energy storage. This can make positioning the battery (or batteries) lower in the housing a good choice, such as inside sidewall 918 or base 917. It is desirable to mount the battery in the same sidewall as the control board. This keeps wiring distance short, and avoids the complexity of dealing with wiring going around corners and passing from one subassembly to the next. Accordingly, in an embodiment, the energy storage component (battery) and the control board should be located together in the front sidewall.

However, placing both control board and battery within the same sidewall can have attendant challenges. For example, providing sufficient additional space for insulation can prove extremely difficult. This can force battery placement into the left or right sidewall, or into the base, and require dealing with the resulting complications. Placing both control board and battery within the same sidewall can have another drawback. A highly desirable characteristic for a chest-type cooler is strength. Off-grid environments can be relatively primitive. A cooler housing, particularly the sidewalls, can be subjected to considerable force, especially when the cooler is bumped or crushed. Further, a chest-type cooler should withstand significant compressive loads so that: objects can be stacked upon it, it can be used as a seat, and so that the cooler can even be used as a footstool supporting a human being. Placing a control board and/or a battery in a sidewall creates a void and disrupts the structure of a sidewall, which can weaken it. Furthermore, some technologies for fabricating a high strength cooler sidewall, such as roto-molding, can be incompatible with including electronics in the sidewall and can prevent its use.

Applicants have configured cooler 900, the presently discussed embodiment of a solar energy-storage cooler, so that the aforementioned limitations on incorporating an energy storage device within a cooler are overcome. Specifically, cooler 900 can (a) allow a user direct and easy access to operate the cooler features including the energy storage device features, (b) provide convenient access to the power input and power output connections, (c) avoid long and costly (and reliability impacting) wiring runs, (d) avoid weakening sidewalls with the energy storage device components placed therein, and (e) allow access to high strength fabrication techniques for the sidewalls. The present embodiment accomplishes this by placing all circuitry in lid 930 of housing 910.

Placing all the electrical components and circuitry in the same place can eliminate long wiring runs and allow some components, such as connectors, to be directly mounted to the control board. Lithium ion battery technology is used in the present embodiment. The resulting high-energy density allows ample amounts of energy storage in the limited space of the lid that is also shared with the control board. The low mass density keeps the lid a reasonable weight for opening and closing. A touch-screen can be used for control and to display status. Instead of facing the touch screen forward from the front sidewall, it is positioned at the front edge of top surface where it is still easily accessed by a user. Speakers can be located on the front edge of the lid and project sound in the correct direction. The exterior lighting can be placed around the outer perimeter edge of the lid and lighting for the interior on its underside. The power input and power output connections can also be placed on the lid's front edge. However, when connected, cords leading from these connections will interfere with access to the cooler interior when the lid is opened. Placing the connections on the rear edge of the lid allows the cords to stay connected and move minimally when opening the lid. Easy connection is facilitated with the user able to lean over the top of the cooler. The solar panel can be mounted on the top surface of the lid, adjacent and close to the control board and still oriented the correct direction. Finally, positioning all electronics and associated connections in the lid removes them all from the rest of the housing. In this embodiment, although not required, the tub can remain a conventional chest-type cooler and, without any electronics or batteries, is free to benefit from all the same high strength design and manufacturing techniques available to conventional chest-type coolers.

In cooler 900, the two subassemblies of a CCESS previously discussed are mounted together and are supported in lid 930 of the cooler. Referring to FIG. 9C, one of the subassemblies, a control board 980, is mounted inside lid 930. The board is shown in phantom and drawn using dashed lines. The control board can be mounted horizontally (i.e. mounted in a plane parallel to the interior surface of the lid) and just inside of the lid's rear edge. The other subassembly, a removable energy storage component 983, is mounted separately from the control board and located immediately below secure compartment 970. In block diagram 200 of a mobile energy storage device shown in FIG. 2, the energy storage component is indicated by reference number 205. Removable energy storage component 983 is an instance of energy storage component 205, with the additional feature that the component is removable. In this embodiment, the removable energy storage component is advantageously held in place by a ball-point pen like latch with a push-in hold and then push-in again release feature.

Removable energy storage component 983 offers several benefits. If there is insufficient sunlight or external power with which to power cooler 900, the energy storage component can be removed when it is depleted. It can then be replaced with a fully charged energy storage component that has been held in reserve. The present embodiment of cooler 900 includes a second energy storage component (not shown) that is not removable. The second energy storage component is incorporated into the control board and has a lower energy storage capacity than the removable energy storage component. The second energy storage component is used to sustain power when energy storage component 983 is removed, for example, while being replaced. A cooler with an energy storage component that is removable can also function as a charge station. When there is sufficient sunlight or external energy available to charge removable energy storage component 983, a fully charged component can be replaced with an empty or depleted storage component for charging.

The two subassemblies, control board 980 and removable energy storage component 983, together comprise CCESS 985. A practitioner of ordinary skill in the art will appreciate that the CCESS does not require the energy storage component be removable. The practitioner will also appreciate that the CCESS can also be located elsewhere within housing 910 other than within lid 930. However, especially in light of the previous discussion, the practitioner should further appreciate the benefits of placing the CCESS in the lid and making the energy storage component removable.

A practitioner of ordinary skill in the art will be aware that there are different ways, in keeping within the sprit and teachings of this disclosure, for housing 910 to support compartment door 967 such that the door can move between the first, open position and the second, closed position. Different embodiments and design considerations regarding the compartment door support will now be discussed. The examples and considerations presented hereinafter should not be considered as a complete list and are not intended to be limiting. In some embodiments, the compartment door can be supported such that it can slide parallel to the surface of the housing. In one example of such an embodiment, the compartment door can include parallel runner features fabricated on opposite sides of the door. These runners can then slide in parallel slots fabricated into the housing. This type of embodiment can be used with injection molded plastic parts such as, for example, a battery cover door in a remote control. In other embodiments, the compartment door can be supported by a hinge so that the compartment door can rotate about a hinge axis that lies in the plane of the housing surface. An example of these embodiments can include a compartment door with two short cylindrical protrusions, centered on the same axis, fabricated into opposite sides of the door. These protrusions fit into holes of an appropriate diameter relative to that of the cylindrical protrusions. These holes can be fabricated into the housing, centered on the same axis, such that the compartment door is supported for hinged rotation. The centering axis for the protrusions aligns with the centering axis for the holes and forms the hinge axis—about which the compartment door hingedly rotates. Another example can be a similar embodiment of a hinged door in which the protrusions and the holes switch places; the protrusions are fabricated into the housing and the holes into the door. This type of embodiment can be used with injection molded plastic parts and can be found in some commercial products. These plastic 'mailbox-door' type parts can have protrusions at each end of the bottom side. The hinge is formed by snapping the protrusions into corresponding holes in the plastic housing.

Applicants observe that it is desirable for compartment door 967, when closed (i.e. in its second, closed position), to be strong enough to resist a forced attempt to access secure compartment 970. Applicants further observe that the closed door is held in place by two mechanical features: lock mechanism 975 and a support structure for movement of the door. There are many techniques, well known to practitioners of ordinary skill in the art, that can be employed in a design to strengthen a feature such as lock mechanism 975. These can include such things as the specific choices for the shape, thickness, and material of critical parts in the lock mechanism. There are also many approaches for strengthening the other mechanical feature holding the door closed, i.e. supporting the compartment door for movement, the other feature holding the door closed. Some of these were discussed in the preceding paragraph. The present embodiment of a solar energy-storage cooler presently under discussion, cooler 900, includes a compartment door supported by a hinge that rotates about a hinge axis to open and close.

In another embodiment, a pinned hinge can be used to strongly support one structure for hinged rotation relative to another. The pinned hinge includes a pin passing through two sets of knuckles. A knuckle is a cylindrical protrusion of material from one of the structures joined at the hinge. A hole passes through the knuckle along the hinge axis (about which the two joined structures hingedly rotate). The pin passes through this hole, centered around the hinge axis. A pinned hinge allows the number of knuckles, the width of each knuckle, and the thickness of the knuckle cylinder wall to be configured such that the joint has the desired strength. Also, the pin can be made of a different and higher strength material, such as steel. In a chest-type cooler, the attachment of the lid to the tub needs to be very strong. In many embodiments of this type of cooler, a pinned hinge is used, as is the case in the present embodiment. (Lid 930 attaches to tub 916 with a pinned hinge). A separate pinned hinge can also be used to support compartment door 967. Positioning secure compartment 970 in the rear edge of lid 930 may appear counter-intuitive. That location faces away from the typical user location, can't be accessed when the lid is open, and restricts the size of the secure compartment. However, positioning the secure compartment in the rear edge of the lid allows the hinge axes of the compartment door hinge and the lid/tub hinge to be collinear or coextensive: allowing the two hinges to be combined thereby sharing a common hinge axis (axis of hinged rotation). A single hinge pin can be used. In addition to cost savings, part count reduction, and the like, the larger knuckle and pin geometries required to meet the lid/tub attachment strength requirements allow for a very strongly closed compartment door as well.

Figure 10:
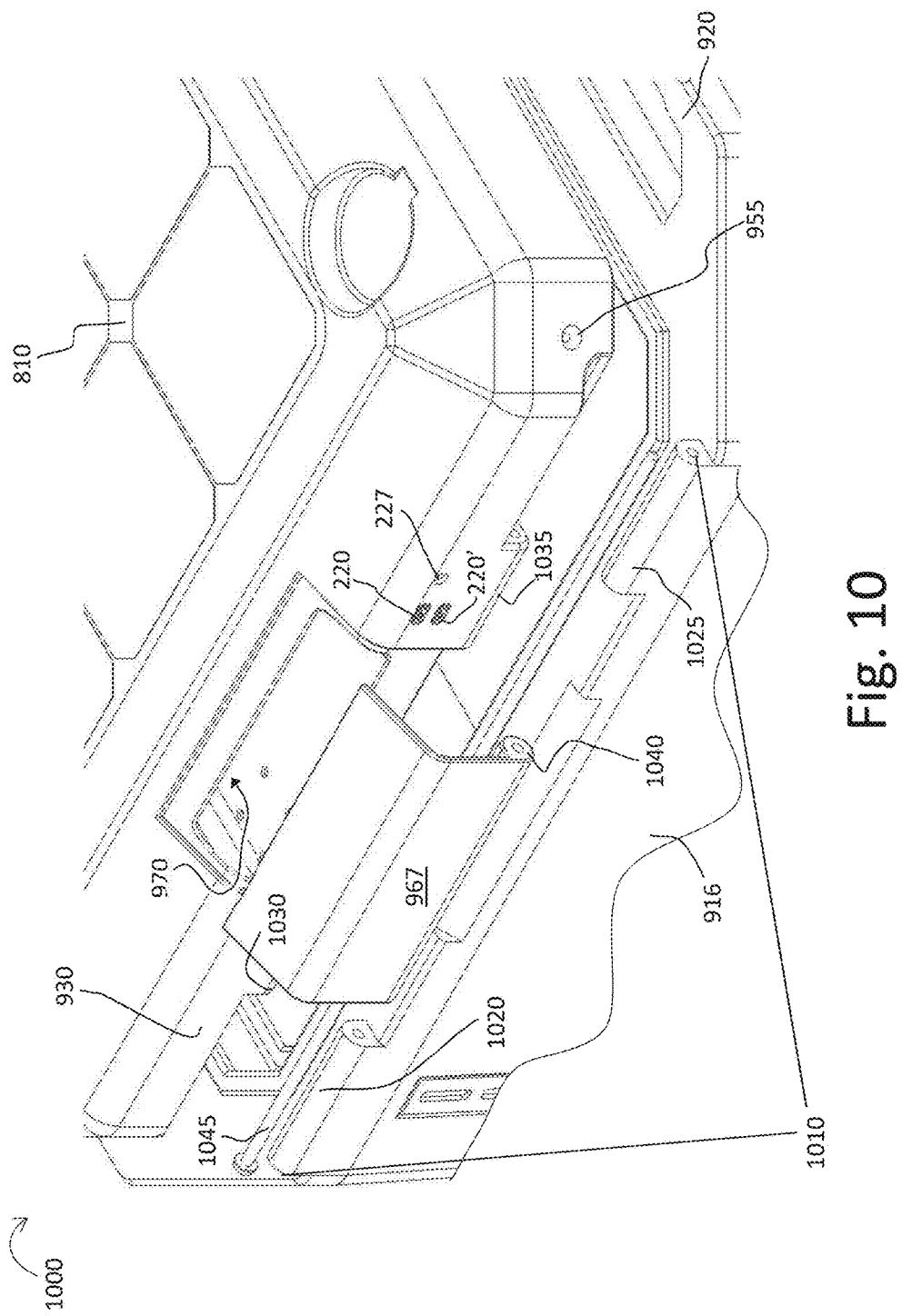
FIG. 10 is an enlarged fragmentary view, in perspective, showing a rear portion of the embodiment of the solar energy-storage cooler of FIGS. 9A-9C, illustrating details of a hinge for the lid and compartment door, in accordance with the present disclosure.

A combined compartment door and lid/tub hinge is shown in FIG. 10. Before examining FIG. 10, it may prove beneficial to review FIG. 9C. The latter figure depicts a rear view of cooler 900 showing, among other things, tub 916, lid 930, and compartment door 967. With continuing reference to FIGS. 9A, 9B, and 9C, FIG. 10 is an enlarged exploded view, generally indicated by reference number 1000, of this same region. In the exploded view, the tub, lid, and compartment door have been slightly shifted with respect to one another to create space between them, for purposes of enhanced illustrative clarity. Tub 916, lid 930, and compartment door 967 are joined together to form an overall hinge 1010. (In the figure, the two lead lines extending from reference number 1010 touch the locations on the tub that will form the ends of the overall hinge when the pieces are joined together). Each of these three parts acts as the flange of a hinge and can rotate independently about a common hinge axis. Each of the parts, (the tub, lid, and door) have one or two knuckles. There are two tub-knuckles 1020 and 1025 protruding up from tub 916, each forming the ends of hinge 1010. There are two lid-knuckles 1030 and 1035 protruding down from lid 930. (The lid-knuckles are difficult to see in the diagram as they are, in this view, mostly hidden by the lid. Only a small portion of lid-knuckle 1030 is visible: most of it is blocked by compartment door 967). Forming the center of hinge 1010, there is one door-knuckle 1040 protruding inward (toward the cooler) from compartment door 967. (Only a small portion of the door-knuckle is visible: one end and a narrow strip at the bottom of the compartment door). In the final assembly, the three parts (or flanges), the tub, lid, and door, can be held in place by a hinge pin 1045. The hinge pin can be installed through all the knuckles and form the hinge axis. In the present embodiment, the hinge pin is comprised of a steel rod. Other suitable materials can be used in different embodiments.

The preceding paragraphs have discussed a shared hinge for independent hinged rotation of the lid and the compartment door about a common hinge axis in cooler 900. Applicants note that this discussion refers to the chest-type cooler housing of cooler 900, and not to the incorporated energy storage device and solar power source. As such, these teachings can also be applied to embodiments of energy-storage coolers and chest-type coolers that include secure compartments produced in accordance with the teachings that have been brought to light herein, resulting in the attendant benefits disclosed herein.

Figure 11:
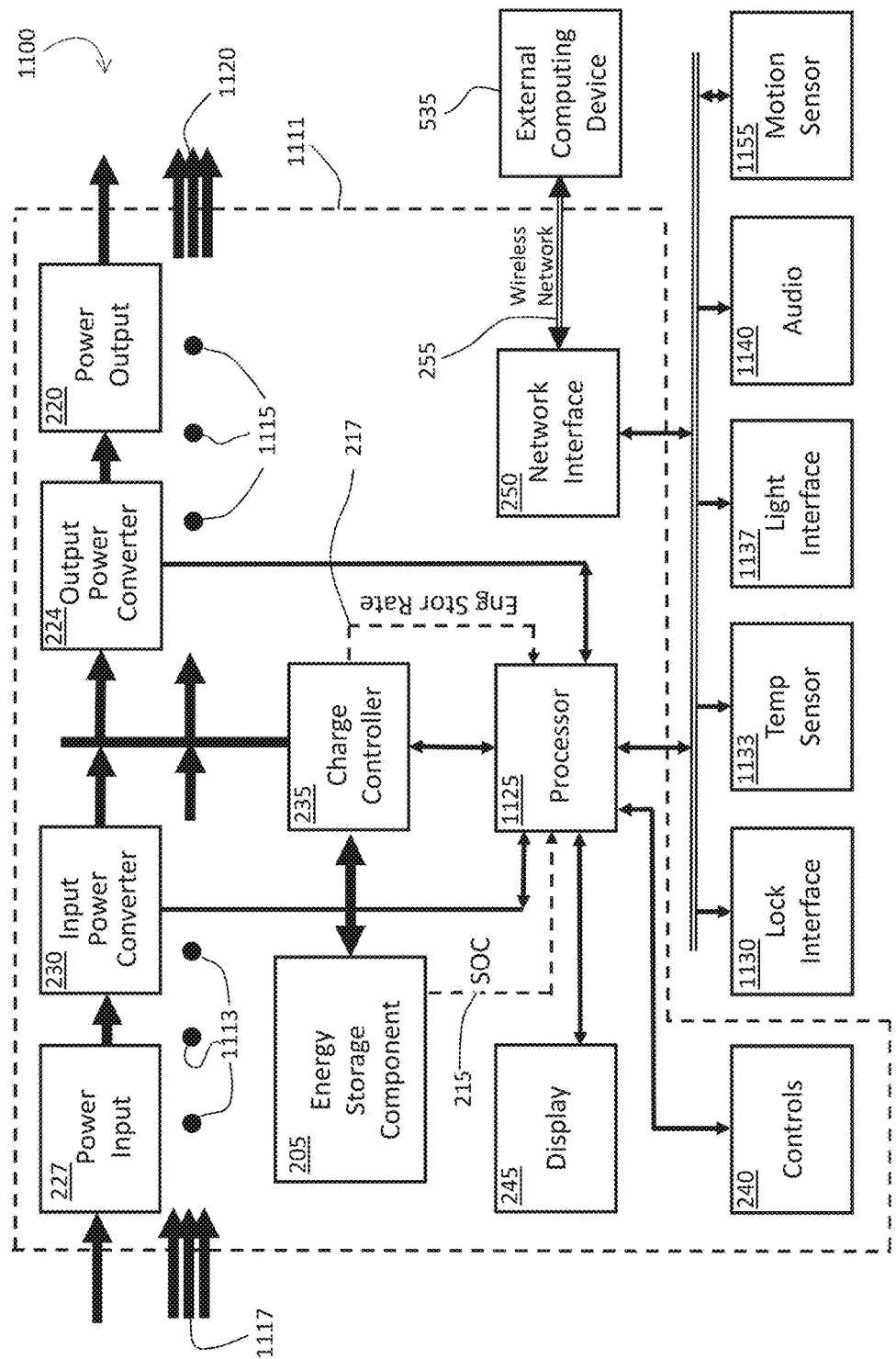
FIG. 11 is a block diagram of the Cooler Control and Energy Storage System (CCESS), illustrating electrical components, interconnections, and relationships, for use in an embodiment of a solar energy-storage cooler or an energy-storage cooler, in accordance with the present disclosure.

A functional block diagram of a Cooler Control and Energy Storage System (CCESS) is provided in FIG. 11 and generally indicated by reference number 1100. CCESS 1100 can be included in an embodiment of an energy-storage cooler and a solar energy-storage cooler, such as CCESS 985 in cooler 900. The region of the diagram surrounded by a dashed line 1111 contains the functions of an AMESD 200 that are illustrated in FIG. 2 and described in the related discussions. Accordingly, descriptions of those functions that have already been presented above may not be repeated here for purposes of brevity. Instead, these descriptions will focus on aspects of FIG. 11 that have not yet been described. FIG. 2 shows AMESD 200 with one power input and two power outputs. However, the associated discussions indicate that an AMESD can include any number of each. FIG. 11 uses three dots 1113 (i.e., an ellipsis) under the input blocks 227 and 230 to indicated an arbitrary number of additional sets of input blocks. Three dots 1115 (i.e., an ellipsis) under the output blocks 224 and 220 are used to indicate an arbitrary number of additional sets of output blocks. Similarly, input arrows 1117 indicate the variable number of inputs associated with the input blocks and output arrows 1120 indicate a variable number of outputs for the output blocks.

Referring to FIG. 11, CCESS 1100 includes a processor 1125. The processor is in a region of the diagram, surrounded by dashed line 1111, that is equivalent to AMESD 200 (FIG. 2). Processor 1125 of FIG. 11 corresponds to processor 225 of FIG. 2 and performs the same AMESD-related functions of as processor 225. In addition, processor 1125 also controls the additional CCESS functions not related to the AMESD. These include a lock interface module 1130, a temperature sensor module 1133, a light interface module 1137, an audio module 1140, and a motion sensor 1155.

With continuing reference to FIG. 11, the electronics of CCESS 985 (FIG. 9C) in the present embodiment are mounted on control board 980 (FIG. 9C) located in lid 930 (FIG. 9A). This includes the additional non-AMESD electronics. Lock interface module 1130 can include the power drivers for the solenoids of lock mechanism 975 (FIG. 9C). Temperature sensor module 1133 connects to interior temperature sensor 960 (FIG. 9A) and exterior temperature sensor 963 (FIG. 9B). The temperature sensors can produce a temperature signal that is indicative of the temperature measured. Interfacing to temperature sensors and receiving temperature signals is well known in the art. Temperature signals can be analog and/or digital. The appropriate circuitry for receiving the temperature signals can be incorporated into the temperature sensor module. Temperature signals in the present embodiment are analog and the temperature sensor module includes instrumentation amplifiers and an analog-to-digital converter to convert analog temperature signals into digital form for processor 1125. Light interface module 1137 can include the power drivers for interior and exterior lights 965 and 955 (both FIG. 9A). Audio module 1140 can include a digital-to-analog converter and a power amplifier to drive speakers 950 (FIG. 9A). Motion sensor 1155 detects changes in the position and orientation of the cooler and will be discussed in detail later. The location of the motion sensor within housing 910 of cooler 900 (both of FIG. 9A) is important to the motion sensor's function. In the present embodiment, the motion sensor is mounted to the control board which is mounted in the lid. This is depicted in FIG. 9C. In other embodiments, the motion sensor may be mounted elsewhere to the housing.

With collective reference to FIGS. 9A-9C, as well as FIG. 10, cooler 900, can be charged externally through power input 227 (FIG. 9C) which, in the present embodiment, is in the rear edge of lid 930 conveniently close to control board 980. The power input can be a standard barrel-type 12-volt dc connector and can advantageously be mounted directly to the PCB. In situations where connection to the electrical grid is available, the cooler can be connected to a standard 120-volt ac outlet through an external ac-to-dc power converter module (not shown). In other embodiments, as previously discussed regarding FIG. 2, an appropriate ac-to-dc input power converter can be incorporated into the CCESS. In such an embodiment, power input 227 can be connected directly to a standard electrical grid outlet and no external module would be required. In the present embodiment, the AMESD functions of CCESS 985 can also receive energy on an internal power input (not shown) connected to solar power source 810. As discussed earlier regarding FIG. 9B, the solar power source can be mounted to the top of lid 930, directly above and a short connection distance from control board 980.

CCESS 985 can supply electrical energy through power outputs. In cooler 900, power outputs 220 and 220' are located on the rear edge of lid 930. and are shown in FIG. 9C. These external power outputs are configured as high-power USB ports, nominally supplying 5 volts dc, and can provide power for portable electronic devices such as, for example, cell phone, tablets, and e-book readers. The outputs can support a negotiated high-power mode, such as Quick Charge, that allow high currents and voltages to be supplied to devices that indicate the mode(s) are supported. Like power input 227, power outputs 220 and 220' in the present embodiment, are located adjacent to control board 980 for convenient connection and can be mounted directly on the PCB. The CCESS can also configure power outputs to supply power to internal destinations, such as interior lights 965, exterior lights 955, and the power for an internal stereo amplifier (not shown) driving speakers 950. Again, each of these destinations is a short distance away from the control board, and, depending on specifics of the mechanical design, can be mounted directly on control board. In the present embodiment, the interior lights are mounted to the back side of the control board and illuminate the interior from the underside of the lid.

As discussed above, controls 240 and display 245 for CCESS 985 can be embodied in touchscreen 945, which interfaces with and is controlled by processor 1125. The processor can manage the touchscreen to additionally control the cooler functions that are not related to energy storage. These functions can include, by way of non-limiting example, turning on and off exterior lights 955, locking and unlocking compartment door 967 to allow access to secure compartment 970, and monitoring the interior and exterior temperatures. The layout of the touchscreen display used to control AMESD 200 and depicted in screen shot 300 (FIG. 3) can be augmented to include these additional cooler functions. The screen shot of such an augmented layout that can be used in touchscreen 945 to control cooler 900 is displayed in FIG. 12.

Figure 12:
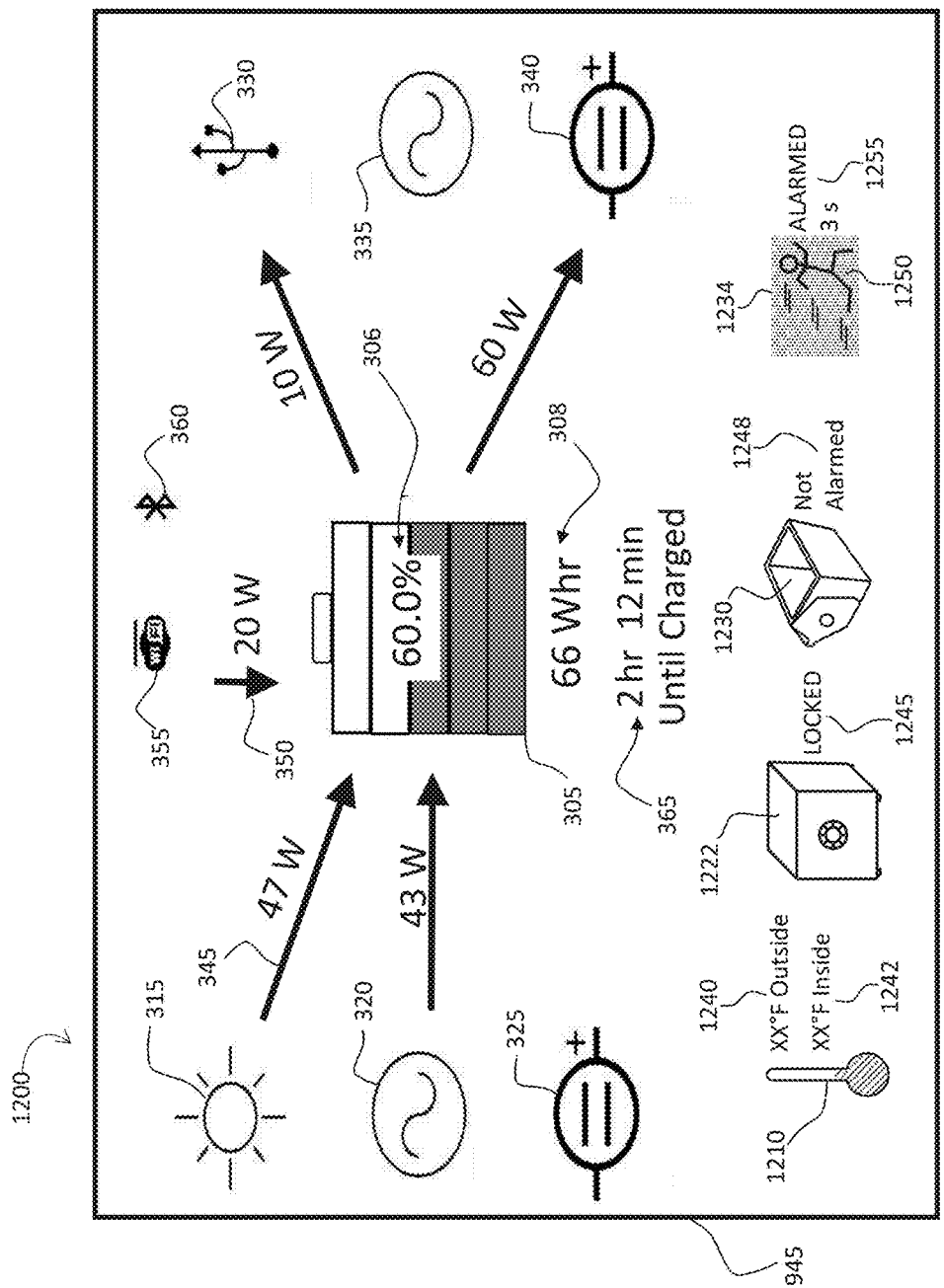
FIG. 12 is a diagrammatic representation of an embodiment of a screen shot of the display of the solar energy-storage cooler produced in accordance with the present disclosure.

The reader's attention is now directed to FIG. 12, which depicts an embodiment of a screen shot 1200 of touchscreen 945. In the figure, screen shot 1200 can include the structure of screen shot 300 of display 245 from FIG. 3. Accordingly, the present descriptions will be limited to describing those differences with features that are not explicitly discussed being understood to be present for purposes of brevity. Several icons can be added to screen shot 1200 that represent additional functions of cooler 900 relative to the functions of AMESD 200. In this embodiment, these icons are a temperature icon 1210, a lock status icon 1222, a lid alarm icon 1230, and a theft alarm icon 1234. In the discussion that follows, in addition to FIG. 12, items from FIGS. 9A, 9B, and 9C will also be referenced regarding the hardware components of cooler 900 to which these icons refer. In addition, in the following discussion, reference may be made to what a specific icon represents and what meaning can be inferred from the shape, coloring, shading, etc. of the icon. References may also be made to textual and numeric information that may be displayed along with the icon. These references are by way of non-limiting example and should not be considered as required in keeping with the spirit and teachings of the present Application.

Temperature icon 1210 can be a depiction of an analog thermometer to represent the measurements of temperatures in and around cooler 900 made by temperature sensors, such as interior temperature sensor 960 and exterior temperature sensor 963. The measured temperature values can be indicated by text next to the temperature icon such as an outside temperature value 1240 and an inside temperature value 1243. Touching the temperature icon can toggle the display units between degrees Celsius and degrees Fahrenheit.

Lock status icon 1222 can be a depiction of a floor safe and indicate whether secure compartment 970 is locked. The text "LOCKED" and "Open" can appear next to the lock status icon and indicate the corresponding state of lock mechanism 975. Screen shot 1200 indicates that the secure compartment is currently locked by the displaying the text "LOCKED" as indicated by reference number 1248. Touching lock status icon 1222 can cause the touchscreen to switch to a depiction of a standard 10 key numeric keypad (not shown) with the keys representing the digits '0' through '9' and a key each for 'backspace' and 'enter'. The keypad screen can be used to lock and unlock the secure compartment. Locking and unlocking the secure compartment will be discussed in greater detail below.

Lid alarm icon 1230 can be a depiction of a portable cooler that can be used to indicate that the lid alarm is armed and will sound if cooler 900 is opened. The lid alarm icon can provide indications in one or more ways. In one of these, two different depictions of a portable cooler can be used for the two states of the alarms, such as a cooler with a closed lid indicating the armed state and a cooler with the lid open indicating the disarmed state. In another way, the icon can be grayed-out (depicted in a gray colored square) to indicate the alarm is armed. In yet another way, text next to lid alarm icon 1230 can directly state the alarm status, for example "ALARMED" or "Not Alarmed". Screen shot 1200 shows the text "Not Alarmed" displayed adjacent to the lid alarm icon, as indicated by reference number 1248, indicating that the lid alarm is disarmed and it is safe to open the cooler; In a similar manner to the way in which the secure compartment is unlocked, touching the lid alarm icon can bring up a keypad, which can then be used to arm and disarm the lid alarm. The lid alarm and the arming/disarming sequence will be discussed in greater detail below.

Theft alarm icon 1234 can be a depiction of a running man used to indicate that the theft alarm is armed and will sound if cooler 900 is moved. As with previously discussed icons, the indication of armed and disarmed state can be provided in multiple ways: the icon can change, the icon can be grayed-out, and text adjacent to the icon can change. In screen shot 1200, the theft alarm icon indicates that the alarm is armed. The icon is grayed-out and labeled with the text "ALARMED", indicated in by reference numbers 1250 and 1255, respectively. Also, as previously discussed, touching the theft alarm icon can display a keypad used when arming and disarming the alarm. The theft alarm and the arming/disarming sequence will be discussed in greater detail below.

User control of the present embodiment of a solar energy-storage cooler will now be discussed with reference to FIGS. 11 and 12. There are two ways a user can control cooler 900: interact with the cooler directly or indirectly. Direct interaction takes place with the user located physically proximate to the cooler. Examples of direct interaction include: buttons, a keyboard, indicator lights, a display, and a touchscreen. Indirect interaction occurs when the user is not located physically at the cooler, but is instead directly interacting with an external computing device. Examples of indirect interaction include: using an app on a smart phone or accessing the cooler from a remote device over the internet. A user can interact with cooler 900 directly by using touchscreen 945 (FIG. 9B) and indirectly by using external computing device 535 (FIG. 5).

When the user is directly interacting with cooler 900 via touchscreen 945 (FIG. 9B), processor 1125 can control the interaction. Recalling the earlier discussion concerning the touchscreen fulfilling the functions of display 245 as well as controls 240 (both of FIG. 2), the processor can determine the screen contents presented to the user on the display and can observe the user's touches of the controls. When the user is indirectly interacting with the cooler using external computing device 535 (FIG. 5), the processor can cooperate with the external computing device to control the interaction. Processor 1125 can use network interface 250 to communicate with the external computing device over wireless network 255, such as, by way of non-limiting examples, WIFI and/or Bluetooth. It should be noted that the cooler and the external computing device need not be directly connected to cooperate, there need only be a communication path. There can be intervening devices such as, again by way of non-limiting examples, network hubs, switches, bridges, routers, proxies, etc. The communication pathway can also include different networks with different protocols.

Practitioners of ordinary skill in the art will appreciate that there is a spectrum of ways in which processor 1125 can cooperate with external computing device 535 in light of this overall disclosure. Toward one extreme, the control can be centered in the processor and the external computing device can emulate a touchscreen, providing a logical interface to the processor similar to display 245 and controls 240 (both of FIG. 2). Toward the other extreme, the control can be centered in the external computing device and the processor can emulate logical interfaces to the functions of cooler 900 like those available to processor 1125. For example, the processor can present a logical interface to the external computing device for controlling audio module 1140 that emulates the logical interface presented to processor 1125 by audio module 1140. In the present embodiment, the processor and the external computing device cooperate using a technique from the middle of the spectrum that splits the control between them. Processor 1125 provides a custom 'command-line' logical interface to external computing device 535 with custom commands well suited to cooler 900 functions. For example, the external computing device can send the processor commands of 'set external lights 50%' and 'read interior temperature'. The 'command-line' interface protocol of the presently discussed embodiment can communicate using alphanumeric text (and is human-readable). Other embodiments can use a more compact protocol such as using binary codewords for commands and responses.

With continuing references to FIGS. 11 and 12, the contents displayed on touchscreen 945 (FIG. 9B) and screen shot 1200 allow a user to check the status of cooler 900. Processor 1125 can monitor the cooler hardware and modify the touchscreen display as values change to keep the status displayed current. For example, battery icon 305 and percentage 306 (both FIG. 12) indicate the amount of energy remaining in energy storage component 205. The processor can monitor the amount of energy remaining by reading the State of Charge (SOC) 215 of the energy storage component 205 (FIG. 11). If it is necessary, processor 1125 can update the touchscreen contents by writing the appropriate data to display 245 (FIG. 11). If the user is indirectly controlling the cooler from external computing device 535 (FIG. 11), the displayed status can be kept current by the external computing device. In the present embodiment, the external computing device sends a 'read SOC' command to processor 1125 over the 'command-line interface' protocol functioning over wireless network 255. Processor 1125 uses network interface 250 to obtain the 'read SOC' command and measures the State of Charge (SOC) 215 of energy storage component 205. Processor 1125 error checks and formats the value obtained into the proper response format and sends the response back over the wireless interface. External computing device 535 can then update its display accordingly.

For a mobile energy storage device, status information that can be especially useful includes an estimate of the time remaining until the battery is charged or discharged. This can be more generally expressed as an estimate of time (until or at which) the energy storage component (battery) reaches a particular level of charge (e.g. fully charged or discharged (i.e., empty)). This was discussed earlier regarding an embodiment of a mobile energy storage device, AMESD 200. The discussion relating to FIGS. 2-4 describes the determination of estimate of time 365 indicated on display 245, as shown on screen shot 300. As a solar energy-storage cooler includes a mobile energy storage device, the estimate of time status continues to be important. In cooler 900, example screen shot 1200 includes an estimate of time 365. The associated structure of the cooler is illustrated in FIGS. 11 and 12 and includes structure corresponding to that of the previously described AMESD. Accordingly, the present descriptions will be limited, insofar as practical, to describing differences. In addition to FIGS. 11 and 12, referencing FIGS. 9A, 9B, and 9C may be useful.

Equations 1 and 2 show how estimate of time 365 can be determined from state of charge 215 and energy storage rate 217. Measurement of the state of charge (SOC) is illustrated in both FIGS. 2 and 11 by a dashed line from energy storage component 205 to the processor, possibly via an analog-to-digital converter (not shown). The energy storage rate is the rate at which electrical energy flows into the energy storage component. In both figures, the path of this energy flow is illustrated by the thick line connecting charge controller 235 to energy storage component 205. FIG. 2 shows the measurement of energy storage rate by dashed line 217 leading from this thick line to the processor. FIG. 11 shows the energy storage rate measurement originating from the charge controller. In cooler 900, the charge controller measures the energy storage rate at the point where electrical energy enters/leave the charge controller travelling to the energy storage component.

Both the measurements of state of charge (SOC) 215 and energy storage rate 217 are supplied to the processor (processor 1125 in the present embodiment). As discussed a few paragraphs above, communication between the processor and external computing device 535 over wireless network 255 allow the processor and the computing device to cooperate. A given embodiment of a cooler can be configured to operate in many ways. If the cooler is not connected to an external computing device, processor 1125 can determine estimate of time 365 directly and can indicate the resulting value on touchscreen 945. When one type of external computing device is connected, the processor can still determine estimates and send the results to the external computing device for indication to the user there. When connected to a different type of external computing device, the processor and the external computing device can cooperate to determine the estimate, using additional resources on the external device, if available.

Solar energy-storage cooler 900 can provide audio from one or more speakers 950. (FIGS. 9A, 9B, 9C, and 11 will be referenced in this discussion). The speakers can be suitably located on housing 910. In the present embodiment, there are two speakers, both located in lid 930. The speakers can be driven by a power audio amplifier located in audio module 1140, which can be incorporated into control board 980. In the audio module, the power amplifier can amplify audio signals created by audio-quality Digital-to-Analog Converters (DACs). The present embodiment has a 2-channel (stereo) audio system with one channel for each speaker, requiring two channels of power audio amplifiers and two channels of DACs. Processor 1125 can supply data to a DAC, either directly or, as in the present embodiment, through a First-In-First-Out memory (FIFO). There can be appropriate filtering between the DACs and the power audio amplifier, such as a low-pass anti-aliasing filter.

In one feature, audio can be provided by cooler 900 functioning as external speakers for a portable electronic device, such as a smart phone. (In this specification, a portable electronic device is referred to as an external computing device). A popular way to connect to external speakers is using Bluetooth, a wireless network. In the present embodiment, the cooler can function as a Bluetooth stereo speaker. Continuing the reference to FIG. 11, processor 1125 uses network interface 250 to communicate (using the Bluetooth protocol) with external computing device 535 using wireless network 255. The processor and the external computing device cooperate to 'pair', i.e. create a logic link over the network. The external computing device can then stream audio content to the cooler. The audio data is received by the network interface and transferred to audio module 1140, the processor supervising the transfer. In the audio module, the audio data is stored in the FIFO. At the appropriate time, the data is transferred from the FIFO into the DAC, converted into analog, and driven by a power amplifier into speaker 950 (FIG. 9A).

The cooler can also use speakers 950 (FIG. 9A) to communicate with the user. For example, during user interactions with touchscreen 945 (FIG. 9B), the speakers can produce a click when a symbol is touched. Tones can be associated with the different touchscreen pages and the corresponding tone produced when the displayed page changes. Processor 1125 can generate these and other sounds by sending a sequence of values to audio module 1140. The values can be stored in a non-volatile memory (such as Flash) or determined on-the-fly. The sounds produced can include speech communicating instructions, status information, and warnings. For example, the cooler can produce the words "cooler too warm" when interior 915 (FIG. 9A) exceeds a predetermined threshold temperature. The processor can obtain the stream of values to send to the audio module from non-volatile memory. Data used to create the speech can be stored in compressed form. The speakers can also be used to emanate an aural indication of an alarm, becoming an audio annunciator. The alarm can indicate an error condition, such as over-temperature, or indicate a theft attempt. Both of which will be discussed below. The alarm sounds can be a distinctive and/or harsh sound produced at a loud volume to attract attention. The alarm sounds can also include voices saying such things as "Help! I'm being stolen." and "Take a picture, this person is stealing me!".

Touchscreen 945 (FIG. 9A) can be used to facilitate access to secure compartment 970 (FIG. 9C) via lock mechanism 975. The operation of the touchscreen and the lock mechanism were discussed earlier in the sections of this specification regarding FIGS. 12 and 9C respectively. With reference to these two figures and FIG. 11 (the CCESS block diagram), the locking and unlocking of the secure compartment can now be discussed. After placing an object that the user desires to protect in the secure compartment, compartment door 967 (FIG. 9B) can be closed. As discussed earlier, when the door is closed, a spring in the lock mechanism can cause it to automatically latch. In cooler 900, the secure compartment can be protected by a 'combination lock' that requires a combination to be entered before unlocking the compartment door and allowing access. In another embodiment of a cooler, an actual keypad of physical buttons can be used for entry of a combination. In the present embodiment, a 'virtual keypad' on the touchscreen is used.

The user can activate the 'combination lock' after closing compartment door 967 by touching lock status icon 1222 on touchscreen 945. The present embodiment requires entry of the combination each time the lock is activated. Processor 1125 can monitor the touchscreen for the user's touch of the icon and, when detected, can reconfigure the touchscreen to display a 'virtual keypad'. The processor displays a depiction of a 12-button keypad on the touchscreen, with a depiction of a button each for the digits 0 through 9, a depiction of a button for deleting the previous entry, and a depiction of a button to indicate the end of the sequence. The user enters the combination by touching the depictions of the keypad's buttons on the touchscreen. After entry, the processor can store the combination in non-volatile memory. In the present embodiment, a hash function on the combination is determined and the resulting hash value, or hash, is stored. The same hash function is used on the combination entered when unlocking the secure compartment and the resulting hash compared with the stored hash. The user's actual combination is never stored.

When the user desires to retrieve the object that is stored within secure compartment 970, the procedure can be repeated. The user touches lock status icon 1222 on touchscreen 945. Processor 1125, monitoring the touchscreen, detects the touch, and commands the touchscreen to display the 'virtual keypad' discussed above. The processor handles the virtual key presses as the user enters the number sequence that forms the combination. After the number sequence (combination) has been entered, the processor determines the hash value and compares it to the stored hash value. If they are equal, the processor enables the appropriate power driver in lock interface module 1130 which sends an electrical signal to the solenoid in lock mechanism 975. The solenoid energizes, unlatches the lock mechanism, and releases locking feature 977. Recalling the previous discussion regarding the lock mechanism (FIG. 9C), the compressed spring pushes open compartment door 967. The processor must keep the solenoid energized for a long enough period to allow the spring to push the door far enough for the locking feature to clear the latch. The user can then recover the object from the secure compartment.

The 'combination lock' feature will now be reexamined in an analytic manner. The combination discussed above is an ordered sequence of numeric digits. It is also a specific instance of an ordered sequence of symbols, a decimal digit '0' through '9' being a specific instance of a symbol. An ordered sequence of symbols can be referred to as a codeword. A codeword of decimal digit symbols is the combination that is used to authorize access to secure compartment 970 in the present embodiment. In another embodiment, the codeword can consist of an ordered sequence of alphanumeric symbols. In yet another embodiment, the 'combination' can be a path drawn by a user on touchscreen 945. The path can be represented as a codeword of an ordered sequence of symbols describing the path's coordinates. The codeword symbols contain user inputs and can represent an interaction, or piece of an interaction, with a user in verifying authorization. These can include, by way of non-limiting example, pressing buttons on a keyboard, the coordinates of a drawn path, or samples from the waveform of a spoken passphrase. The codeword symbols can also represent a measurement of a physical attribute of a user (biometrics), such as, again by way of non-limiting example, a characteristic of a fingerprint or a pixel of the picture of a face. Any suitable codeword/password technique, either currently available or yet to be developed, can be used.

When access to secure compartment 970 is desired, a codeword can be created by the user's inputs and interactions: buttons pushed, a path drawn, a fingerprint scanned, etc. The generated codeword is evaluated to verify it satisfies a set of criteria. When the codeword is sequence of numeric digits, the criterion can be a simple equality check to a stored previously entered codeword. In the present embodiment, the equality check is performed on the results of passing the codeword through a hashing function. In other embodiments, where the user input is more complex, the set of criteria can also be more complex. For example, if a codeword is generated from the sequence of coordinates through which a path drawn by the user, the criteria used to evaluate the codeword must account for uncertainty in in the user's ability to accurately draw a path.

FIG. 9C (secure compartment hardware), FIG. 11(CCESS block diagram), and FIG. 12 (touchscreen screen shot) continue to be referenced. In the present embodiment, processor 1125 is used to determine the codeword from the user interactions with the 'virtual keypad' (by touching 'virtual buttons'). The processor is also used to evaluate the criterion that the hash value generated from that codeword be equal to the hash value stored when the secure compartment was locked. In other embodiments, these functions can be split apart. The user can input into or interact with external computing device 535, as discussed above, to 'dial the combination'. The external computing device can generate a codeword corresponding to the user's inputs and interactions and send the codeword to the processor over wireless network 255, which allows the user to conveniently be a distance away from cooler 900. Upon receiving the codeword, the processor can check that it meets the required criteria and then unlock compartment door 967 as discussed above. In another embodiment, the processor and the external computing device can cooperate in determining if the criteria are met for unlocking the secure compartment. The password system of the external computing device can be used to authorize access; the user can be allowed to lock and unlock the secure compartment without entering an addition combination. Security is provided because only an authorized (logged in) user on the external computing device can execute the program unlocking the secure compartment.

The next few paragraphs will regularly refer to FIGS. 9A, 9B, and 9C (cooler hardware), FIG. 11 (CCESS block diagram), and FIG. 12 (screen shot). Cooler 900 can include a theft alarm that can detect if the cooler has been moved more than an allowable amount. Control board 980 can include motion sensor 1155. The motion sensor can include one or more sensors that produce an output responsive to a physical parameter sensitive to changes in position and orientation. The output of these sensors can be used to characterize motion of the cooler housing. These physical parameters can include acceleration, angular momentum, and magnetic field. The corresponding sensors for these parameters are an accelerometer, gyro, and magnetometer. A magnetometer can measure the magnitude and direction of the magnetic field produced by the earth and can be used to determine orientation relative to the earth. The motion sensor can be referred to as an IMU and can be fabricated using MEMS technology. (IMU is an acronym for Inertial Measurement Unit and MEMS is an acronym for Micro Electro Mechanical System). The present embodiment of cooler 900 includes motion sensor 1155 with three accelerometers and three gyros that measure linear acceleration along and rate of rotation about three orthogonal axes. The motion sensor can be referred to as sensing 6 degrees of freedom. One embodiment of a motion sensor sensing 6 degrees of freedom can be a LSM6DS3 manufactured by ST Microelectronics.

The theft alarm can be armed and disarmed using touchscreen 945 in the same way that secure compartment 970 can be locked and unlocked, as discussed above. As touching lock status icon 1222 initiated locking and unlocking of the secure compartment, the user can touch theft alarm icon 1234 to arm and disarm the theft alarm. The processor can indicate that the theft alarm is armed on the touchscreen as discussed above with reference to FIG. 12. While in the armed state, processor 1125 (FIG. 11) can monitor the outputs of motion sensor 1155 to determine whether the outputs meet one or more predetermined criteria for determining when to set an alarm condition. A criterion can include processing one or more of the motion detector output signals before making the determination. A practitioner of ordinary skill in the art of control systems can implement the sensing described herein with this overall disclosure in hand.

For example, in one embodiment, the output of the accelerometer measuring linear acceleration along the vertical (Z) axis can be monitored. The output signal can be appropriately low-pass filtered to eliminate detector noise and can also be offset-drift compensated using the a priori knowledge that the cooler was stationary prior to movement. There are other approaches to compensating for integrator induced drift from offsets. For example, a 'leakage' can be applied to each stage of integration that slowly returns the output of the integrator to zero. The resulting filtered and compensated acceleration signal can be double integrated to determine a relative position that is then compared to a threshold. If the threshold is exceeded then an alarm condition can be declared. For example, in one embodiment, an alarm condition can be set if the vertical (Z axis) accelerometer output signal indicates that cooler 900 has been lifted 6 inches or more in the previous 10 second time period.

Different motion sensor outputs and different criteria can be used. For example, in the same embodiment, the alarm condition can also occur if similarly processed horizontal (X and Y axis) accelerator output signals indicate the cooler has moved a radius of 1 foot or more. Other processing of the output signals can also be used. In another embodiment, a single integrated acceleration signal can be checked to determine if a velocity exceeds a threshold. The output of a gyro (rate of rotation) can be single integrated and compared to determine if the orientation has changed more than a threshold amount of degrees. In still another embodiment, unintegrated output signals can be used to bound acceleration or rotation rates within acceptable levels before an alarm declared. In addition to scalar signal processing, multi-dimensional signal processing, as in an extended Kalman filter, can be employed for better noise/distortion/drift rejection and more reliability.

In the preceding discussion, the user interacts directly with cooler 900 to arm and disarm the theft alarm and the entire operation is controlled by processor 1125 (FIG. 11). As discussed earlier, the user can also interact indirectly with the cooler using external computing device 535, such as by executing an app 540 (both in FIG. 5). In an embodiment, the app can just duplicate, on the external computing device, the user interaction with touchscreen 945 on the cooler. The app can also provide different interaction and different functionality. An example of this can include allowing the user to change the configuration and operation of the theft alarm, such as altering thresholds used in the theft alarm. In another embodiment, the external computing device can cooperate with the processor in the cooler directly, without the need of the app. An example of such an embodiment can include a remote control for the cooler. The cooperation between the processor and the external computing device can take place in differing ways. For example, in one embodiment, the processor can communicate the motion sensor output(s) directly to the external computing device, and that device can make the determination of a theft alarm condition. In the presently described embodiment, the alarm condition determination is performed in the processor, and the external computing device only notified if an alarm condition occurs.

When an alarm condition is set, it can be indicated to the user in different ways, depending on the user's previous setting of the cooler's configurations. The indication to the user can be aural (something the user can hear), visual (something the user can see), and tactile (something the user can feel). In cooler 900, the embodiment presently being discussed, the default configuration includes indication using an aural (audio) annunciator. The annunciator can be a separate component, such as a buzzer, or the annunciator can use the cooler's audio capabilities. As discussed above in the section of this disclosure dealing with the audio capabilities of the cooler, alarm audio waveforms can be produced, amplified, and played from the speakers. Processor 1125 can also cooperate with external computing device 535 in indicating to the user that an alarm condition has occurred. The alarm condition can be indicated on the external device, such as aurally by sound, visually on the screen, and/or tactilely by vibration. The alarm can be indicated on the external device and/or the cooler, depending on configuration.

The presently discussed embodiment of a solar energy-storage cooler, cooler 900, includes a lid-closure detector that determines the current position of lid 930 (i.e. whether the lid is in the open position or in the closed position). Processor 1125 can use the lid-closure detector to turn on interior lights 965 (FIG. 9A) when the lid is open. The detector can also be used to augment the functionality of other features of the cooler such as in temperature measurements discussed below. A practitioner of ordinary skill in the art will already be familiar with many ways in which a mechanical switch can be used to detect lid closure, and with the many disadvantages in doing so. Perhaps the most apparent disadvantage is that mechanical switches wear with use and eventually fail. Even before wear-out, the failure rate for a switch is generally high. Mechanisms using mechanical switches can be susceptible to dirt accumulation and can become intermittent. This can be a particular problem in the environments to which a cooler can be exposed, such as sandy beaches. Furthermore, in addition to the direct costs of switches and the wiring leading to them, additional installation steps can be required, further increasing costs.

Applicants have configured cooler 900 so that the aforementioned limitations are overcome. A theft alarm feature for a cooler was previously discussed in the section of this disclosure associated with FIGS. 11 and 12. A cooler configured with the theft alarm feature can include motion sensor 1155. By positioning the motion sensor in lid 930 of the cooler, a lid-closure detector can be implemented with no additional parts. The interaction of the earth's gravitational field with the multi-axis accelerometer of the motion sensor can be used to detect the open/closed status of the lid.

FIG. 13 is a simplified perspective drawing of a cooler housing 910, generally indicated by reference number 1300 at least for purposes of describing aspects of lid-closure detection in the context of using a multi-axis accelerometer. The figure depicts lid 930 in a closed position 1305 atop tub 916. FIG. 13 also depicts the lid after a rotation of 90° into an open position 1310. Here, the reference number of the rotated lid has been indicated by the reference number 930' to indicate a post-rotation appearance. Two arcuate arrows 1315, drawn in a dot-dash line pattern, trace the path of two corners of the lid as it rotates from closed position 1305 to open position 1310. The lid rotates about an axis of rotation 1320, drawn in a thick dotted line.

A multi-axis accelerometer 1330, serving as part of motion sensor 1155 (FIG. 9C) in the present embodiment, can be supported inside lid 930. Such a multi-axis accelerometer is depicted as a small cube in perspective. On each of the 3 visible faces of the small cube, a double-headed arrow indicates an accelerometer that senses linear acceleration in the direction of the arrow. In this embodiment, the multi-axis accelerometer is comprised of three accelerometers that each sense linear acceleration along one of three orthogonal directions (i.e., triaxial). These are an x-axis accelerometer 1335, a y-axis accelerometer 1340, and a z-axis accelerometer 1345. (The following discussion also applies to accelerometers having a lesser number of sensing axes). When the lid is rotated 90° from closed position 1305 to open position 1310, the multi-axis accelerometer travels with the lid into the open position, tracing the path of arcuate arrows 1350. After rotating with the lid to the open position, the multi-axis accelerometer is a new orientation and so is referred to as a rotated multi-axis accelerometer and designated with reference number 1330'. Each of the rotated x-axis, rotated y-axis, and rotated z-axis accelerometers are similarly designated 1335', 1340', and 1345' respectively. It is useful to remember that the three orthogonal axes (x, y, and z) are referenced to the motion sensor and, depending how the sensor is mounted, are not necessarily referenced to the cooler.

Assume for the moment that cooler 900 is positioned perfectly horizontally on the earth's surface and lid 930 is in closed position 1305. The earth's gravitational field, vertical, will be aligned parallel with the z-axis accelerometer 1345 of multi-axis accelerometer 1330. The gravitational field will be sensed by the z-axis accelerometer as a downward or negative acceleration. When the lid has been rotated into open position 1310, the orientation of rotated multi-axis accelerometer 1345' with respect to the gravitational field is changed. The rotated z-axis accelerometer will then be orthogonal to the gravitational field and therefore no longer be affected by it. Rotated x-axis accelerometer 1335', which was orthogonal to the gravitational field before the rotation with the lid closed, will be aligned parallel with the field after rotation. In the open position, the gravitational field will be sensed as an acceleration by the rotated x-axis accelerometer. Processor 1125 can monitor motion sensor 1155 (FIG. 11) and measure the x, y, and z components of accelerations on an on-going basis. The change in direction of the gravitational field can be used to detect if the lid is open or closed. In a more general approach, the three measured acceleration components can be combined into a vector. The acceleration vector can be monitored for a rotation about the y-axis which reflects rotation of the lid about axis 1320.

Motion sensors can include other sensor types in addition to accelerometers, such as gyros and magnetometers. Magnetometers sense the earth's magnetic field in a way that is analogous to the sensing of the earth's gravitational field by accelerometers. The teachings of the previous discussion on sensing rotation by using accelerometers to measure the perceived direction of gravity can be applied to detecting lid-closure using magnetometers. However, the comparative weakness of the earth's magnetic field and its susceptibility to distortions by nearby metallic structures can add complications. Rate gyros sense the rotation rate of orientation angles about the x, y, and z axes (pitch, roll, and yaw). Integrating the output of the y-gyro yields the change in the angle of rotation about the y-axis. With reference to FIG. 13, the angle of rotation about the y-axis (measurable in the x-z plane of the motion sensor) is a good estimate for the angle of the lid about axis of rotation 1320. The y-axis of the motion sensor is approximately parallel to axis of rotation 1320. Integrating the gyro output can be subject to drift issues. Compensation techniques are discussed above in the section of this disclosure dealing with the theft alarm. Combining different sensors into the detection process, i.e. using decision criteria that include the outputs of different sensors at the same time, can be used to improve reliability.

Lid-closure detection, as presently described, involves observing one or more outputs of motion sensor 1155 to monitor rotation of the sensor relative to a static vector. The vector is the earth's gravitation in the case of accelerometers and the earth's magnetic field in the case of magnetometers. In addition to static signals from rotation, the motion sensor outputs also contain dynamic signals that vary with time. Dynamic signals can include noise and, in the case of accelerometers, signals from movement (accelerations and deaccelerations). Dynamic signals can contribute to making detection errors. However, the dynamic (time varying) signals can be filtered out with a low-pass filter. The integration of gyro signals does not involve observation of a static vector; however, the same conclusion still applies. The present embodiment of a motion sensor based lid-closure detector in cooler 900 includes a low-pass filter to eliminate errors from dynamic signals.

Even if all errors from dynamic signals were removed by filtering, there is still a scenario in which the lid-closure detector described heretofore makes an error. FIGS. 14A and 14B are diagrammatic elevational views of a solar energy-storage cooler in accordance with the present disclosure. FIG. 14A illustrates opening the lid of the cooler by depicting the cooler before and after the lid has been opened. The lid before opening is shown in phantom using dashed lines in FIG. 14A which is generally indicated by the reference number 1400. FIG. 14B illustrates the entire cooler tipping over backwards, rotating in the same direction as the lid does when it opens. This illustration depicts the cooler before and after tipping over and is generally indicated by the reference number 1405. The cooler before tipping is shown in phantom using dashed lines.

FIG. 14A illustrates a 'normal' opening of the lid. Before opening, the lid is indicated by reference number 930 (and drawn in dashed lines). Within the lid, the z-axis accelerometer within multi-axis accelerometer 1330 is parallel to the gravitational field and the multi-axis accelerometer outputs indicate an acceleration of 1 g along the z-axis. In other words, the acceleration along the z axis is approximately 1 g whereas the accelerometer readings on the x and y axes are approximately 0 g. The lid, after rotating into the open position, is indicated by reference number 930' (and drawn in solid lines). Multi-axis accelerometer 1330 follows the path indicated by reference number 1410 while rotating from the closed position to the open position. After opening, the multi-axis accelerometer is indicated by reference numbers 1330'. The gravitational field is now orthogonal to the z-axis accelerometer and aligns with the x-axis accelerometer (not shown). The multi-axis accelerometer outputs indicating an 1 g acceleration along the x-axis (approximately x=1 g, y=0 g, z=0 g).

FIG. 14B illustrates cooler 900 tipping over backwards. Before tipping over, the cooler is depicted standing normally and is drawn in dashed lines. Lid 930 is in the same orientation as the unopened lid in FIG. 14A. Multi-axis accelerometer 1330 outputs indicate an acceleration of 1 g along the z-axis. When the cooler is tipping over, the multi-axis accelerometer follows the path indicated by reference number 1420 while travelling into the tipped-over position. After tipping over, the lid is indicated by reference number 930". The tipped-over multi-axis accelerometer is indicated by reference number 1330" and is in the same orientation in FIG. 14A. The gravitational field is again orthogonal to the z-axis accelerometer and again aligns with the x-axis accelerometer (not shown). The multi-axis accelerometer outputs again indicate an acceleration along the x-axis (approximately x=1 g, y=0 g, z=0 g).

From the discussion in the preceding paragraphs, the procedure for detecting lid-closure described heretofore will result in the same determination for both FIGS. 14A and 14B. In the tipped-over case, this will be an error. This may be acceptable for some embodiments. For example, if the lid-closed detection is only used to control turning on and off interior lights 965 (FIG. 9B), then processor 1125 (FIG. 11) can make this error condition acceptable by limiting the duration of time that the lights are on so that the battery is not drained. Applicants recognize, however, that misdetecting a lid opening responsive to a tip-over can be avoided. In this regard, Applicants recognize that the path traveled by the multi-axis accelerometer while the lid is opening and the path traveled during a tip-over are very different. Detecting the difference between these paths can distinguish a legitimate lid opening (path 1410) from a tip-over event (path 1420).

A legitimate lid opening can be distinguished from a tip-over using the dynamic output signals of motion sensor 1155 (FIG. 11) during the transition from lid closed to lid open. In an embodiment, a master set of waveforms of the motion sensor outputs during a legitimate lid closed to lid open transition are stored in non-volatile memory. (The waveforms can be stored as a sequence of sample values). When a lid-closure transition is detected, such as, for example, from the observed rotation of the static vector (i.e. gravitation and/or earth's magnetic field), the output signals from the motion sensor are monitored during the transition.

The observed motion sensor waveforms are compared to the master set of waveforms using a distance metric, such as the summation of the mean squared error of the differences between the master waveform samples and the observed waveform samples. Another difference metric that can be used is the summation of the absolute value of the differences. A difference metric below a predetermined threshold value indicates a legitimate lid opening. The independent variable of the waveforms that determines at what point the motion sensor outputs are sampled can be time or the rotation angle of the static vector. The master set of waveforms and the detection threshold for the difference metric can be determined by statistical analysis of repeated measurements of the motion sensor outputs during legitimate lid openings.

In another embodiment, the dynamic signals of the motion sensor 1155 can be used to continually update estimates of the position and orientation within a physics model for lid 930 (FIG. 9) running in processor 1125 (FIG. 11). A practitioner of ordinary skill in the art of control systems will be able to implement a physics model for a rigid body such as the lid with this overall disclosure in hand. Example embodiments of such models can include state-estimators and Kalman filters. Attributes of the observed path between lid closed and lid open (see FIG. 14) can be compared to the same attributes of a theoretical path for a legitimate lid opening, path 1410. The observed path can also be compared in the same way to theoretical paths of known illegitimate lid openings, such as path 1420 from a tip-over transition. The theoretical path with the attribute(s) that most closely match the corresponding attribute(s) of the observed path determines whether the detected rotation of the lid is interpreted as the lid opening. Attributes for comparing paths can include, by way of non-limiting example, total path length and net distance along the z-axis traveled. This can be observed by examining these attributes in path 1410 and path 1420 in FIGS. 14A and 14B.

Touchscreen 945 (FIG. 9B) can display the temperatures measured at various locations about cooler 900. (The discussion of temperature measurements will reference FIGS. 9A, 9B, 9C, 11, and 12). Interior temperature sensor(s) 960 and exterior temperature sensor(s) 963 are shown in FIGS. 9A and 9B. The sensor specifics are described in the discussion associated with those figures. The temperature sensors are connected to temperature sensor module 1133 of CCESS 985. (In the present embodiment of a cooler being described, cooler 900, the temperature sensor module is incorporated into control board 983). The sensor module can amplify and filter the temperature signals output from the temperature sensors and convert analog signals to digital. Processor 1125 can read the temperature measurements and perform any necessary signal processing, such as, for example: scaling, offset adjustment, drift compensation, and/or time averaging. The processor can display the resulting values on touchscreen 945 for indication to the user, such as in screen shot 1200. In that screen shot, a value determined from the interior temperature sensor(s) can be displayed as inside temperature 1243 and the value from the exterior temperature sensor(s) as outside temperature 1240. In embodiments where there are a multiplicity of interior and/or exterior temperature sensors, a procedure can be applied to the individual measurements to combine them into fewer, more significant, values to display. This procedure can result in giving some measurement values more weight than others to reflect such things as, for example, the structure of the cooler housing 910, the placement of the temperature sensors upon it, and the specifics of the heat flow within the housing. As discussed above, processor 1125 can cooperate with an external computing device 535 in providing temperature information to the external device and allow it to modify temperature measurement parameters, such as measurement unit choice (Fahrenheit or Celsius).

A cooler can include a temperature alarm that can alert the user if the temperature in the interior can no longer be maintained. The temperature alarm can monitor one or more temperature signals from throughout the cooler housing. Criteria can be applied to the temperatures reported to determine whether the interior temperature is acceptable. By monitoring temperatures other than directly from the interior, the criteria can also estimate if the interior temperature will remain acceptable for some period of time. The temperature alarm can determine whether a criterion is violated. If so, an alarm condition be triggered and indicated to a user. The temperature alarm is implemented by processor 1125 in the present embodiment. The processor monitors the temperature of cooler interior 915 to verify that the temperature stays sufficiently cold. If that criterion (that the interior temperature is remaining sufficiently cold) is violated, the processor triggers an alarm condition, which can, in turn, be indicated to the user. Indication of the alarm condition can be in one or more of the many ways already discussed. The monitoring of a temperature signal and the determination of a criterion violation can be performed by processor 1125 or by external computing device 535 (FIG. 11). The monitoring and the determination can also be performed by both the processor and the external computing device cooperating together. In one embodiment, for example, the processor in a cooler can control measuring the temperature of interior 915. The processor can send the temperature measurements over wireless interface 255 (FIG. 11) to app 540 (FIG. 5) executing on the external computing device (e.g. a 'smart' cell phone). The external computing device (executing the app) can determine whether the criterion is violated. Part of the criterion can include using weather information downloaded from the internet by the external computer device.

Still discussing cooler 900, the present embodiment of a solar energy-storage cooler, a user can enable the temperature alarm by double-tapping temperature icon 1210 on touchscreen 945 as shown on screen shot 1200. Processor 1125 continually monitors the touchscreen for touches by the user. When the double-tap is detected, the processor can display a 'virtual keyboard' and allow the user to enter a value, as described above regarding the secure compartment lock. The entered value can serve as a maximum allowable temperature used by the processor in monitoring the inside temperature. The temperature alarm criterion can be that the inside temperature not exceed the maximum allowable temperature for more than a specified time period. If that criterion is violated, the processor can trigger an alarm condition. It should be appreciated that a criterion can, in addition to including monitoring for too warm a temperature, also include monitoring for too cold a temperature, such as in applications where a cooler is used to preserve warm contents. The criterion for triggering an alarm condition can be predetermined before the alarm is enabled, such as with the maximum allowable temperature described above. The criterion can also be dynamic and change based on observed operating conditions, as described below.

When lid 930 of cooler 900 is opened, there can be inaccuracies introduced in interior temperature measurements. If interior temperature sensor(s) 960 is located on the lid, the sensor can be moved into air of a significantly different temperature while the lid is open. Independent of the location of the interior temperature sensor(s), when the lid is opened, some amount of outside air can replace or mix with interior air, adding or subtracting heat and changing the interior temperature. After the lid is closed, the thermal mass of the cooler and its contents will gradually pull the interior temperature back toward its pre-lid-opening value. The interior temperature will eventually stabilize at some offset away from the pre-lid-opening value. The amount of offset can depend on a long list of parameters: how long the lid is open, the thermal mass of the cooler contents (e.g. ice), the exterior/interior temperature difference, and the like. During the time the lid is open and until the temperature has stabilized again after the lid is closed, these inaccuracies in the interior temperature measurements can cause false alarms.

Fortunately, the interior temperature measurement inaccuracies induced by opening lid 930 can be compensated for, at least to a certain extent. While the temperature alarm is enabled, the heretofore described lid-closure detector can be used to determine when the current position becomes open and the previously discussed inaccuracies occur. The processor can then change the criteria used to determine if an alarm condition should be triggered. For example, the processor can determine an inaccuracy period, defined as the period of time during which the interior temperature may not be accurate. The inaccuracy period can begin when a lid opening is detected and end a recovery delay after the lid is detected as being closed. The recovery delay is a period of time allowed after the lid closes for the interior temperature to re-stabilize. In one embodiment, during the inaccuracy period, the temperature alarm can be held in abeyance: the outputs of interior temperature sensor(s) 960 ignored and no alarm condition ever set. In another embodiment, during the inaccuracy period, the maximum allowable temperature (at which an alarm condition is set) can be adjusted by an offset large enough so that the inaccuracies in the interior temperature values do not cause an alarm. The recovery delay and the offset values can be predetermined values found experimentally during development. The values also can be determined during operation of cooler 900. Processor 1125 can determine the recovery delay and offset values from recordings of the interior temperature values during previous inaccuracy periods. In still another embodiment, these recordings of can be statistically processed to generate an offset waveform, such as by averaging values at each sample time relative to the lid opening. During an inaccuracy period, at each sample time the processor can adjust the maximum allowable temperature by the corresponding value in the offset waveform.

The foregoing description of the invention has been presented for purposes of illustration and description. Accordingly, the present application is not intended to be exhaustive or to limit the invention to the precise form or forms disclosed, and other embodiments, modifications and variations may be possible in light of the above teachings wherein those of skill in the art will recognize certain modifications, permutations, additions and sub-combinations thereof.

What is claimed is:

1. A solar energy-storage cooler, comprising:
    a mobile thermally insulating housing that defines an interior, an opening for access to said interior, and including a lid movable between a closed position that seals said opening and an open position for access to said interior;
    at least one solar power source configured to convert solar energy to electrical energy, said solar power source supported by said housing, and
    an energy storage device supported by said housing, comprising:
        an energy storage component for the storage of electrical energy and characterized by a state of charge representative of an amount of energy stored within said energy storage component and by an energy storage rate into and out of said energy storage component;
        at least one power input through which electrical energy is transferable from the solar power source at least for storage within the energy storage component;
        at least one power input through which electrical energy is transferable into said solar energy-storage cooler at least for storage within the energy storage component;
        at least one power output through which electrical energy is transferable out of said solar energy-storage cooler at least from the energy storage component; and
        a processor configured for at least one of (i) determining an estimate of time until the state of charge at least reaches one or more particular levels at least based on the state of charge in conjunction with the energy storage rate and for generating an indication of the estimate, (ii) cooperating with an external computing device for determining said estimate, and (iii) cooperating with said external computing device for generating said indication,
    wherein said solar power source provides electrical energy at a rate that is responsive to an environmental factor and said estimate of time is based, at least in part, on a prediction of said environmental factor.

2. The solar energy-storage cooler of claim 1 in which one of said particular levels is a minimum level.

3. The solar energy-storage cooler of claim 1 in which one of said particular levels is a maximum level.

4. The solar energy storage cooler of claim 1 wherein said environmental factor includes at least a time of day.

5. The solar energy storage cooler of claim 4 wherein said environmental factor includes a weather prediction.

6. An energy storage system, comprising:
    said solar energy-storage cooler of claim 1;
    said external computing device; and
    wherein said external computing device and said processor cooperate for at least one of determining said estimate and generating said indication.

7. A solar energy-storage cooler, comprising:
    a mobile thermally insulating housing that defines an interior, an opening for access to said interior, and including a lid movable between a closed position that seals said opening and an open position for access to said interior;
    at least one solar power source supported by said housing and configured to convert solar energy to electrical energy;
    an energy storage device supported by said housing including:
        i) an energy storage component for the storage of electrical energy;
        ii) at least one power input through which electrical energy is transferable from the solar power source at least for storage within the energy storage component;

iii) at least one power input through which electrical energy is transferrable into said solar energy-storage cooler at least for storage within the energy storage component;
iv) at least one power output through which electrical energy is transferrable out of said solar energy-storage cooler at least from the energy storage component; and at least one temperature sensor, supported by said housing, for measuring a temperature to generate a temperature signal relating to said interior of said housing;

a processor configured for receiving the temperature signal and for at least one of indicating said temperature to a user of the cooler and cooperating with an external computing device for indicating said temperature to a user of the external computing device, wherein at least one of (i) said processor, (ii) said external computing device, and (iii) said processor in cooperation with said external computing device monitors said temperature signal for violation of a criterion and thereby triggers an alarm condition for indication to at least one of the user of the cooler and the user of the external computing device; and a lid closure detector for determining a current position of said lid selected as one of said open position and said closed position such that said criterion is modified during a period of time following the determination that the current position is the open position.

8. The solar energy-storage cooler of claim 7 wherein said temperature sensor is an interior temperature sensor for measuring an interior temperature of said interior.

9. The solar energy-storage cooler of claim 7 wherein said criterion is predetermined prior to said monitoring.

10. The solar energy-storage cooler of claim 7 wherein said criterion includes said temperature signal exceeding a maximum temperature threshold.

11. The solar energy-storage cooler of claim 7 wherein said criterion includes said temperature signal falling below a minimum temperature threshold.

* * * * *